US012000351B2

(12) United States Patent
Shaver et al.

(10) Patent No.: US 12,000,351 B2
(45) Date of Patent: Jun. 4, 2024

(54) METHOD FOR DYNAMICALLY DETERMINING A FIRING PATTERN FOR AN ENGINE WITH DYNAMIC CYLINDER ACTIVATION AND A SYSTEM IMPLEMENTING THE METHOD

(71) Applicant: Purdue Research Foundation, West Lafayette, IN (US)

(72) Inventors: Gregory M. Shaver, West Lafayette, IN (US); Dheeraj Gosala, Hamburg (DE); Harikrishnan Raghukumar, College Station, TX (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 17/636,993

(22) PCT Filed: Aug. 24, 2020

(86) PCT No.: PCT/US2020/047637
§ 371 (c)(1),
(2) Date: Feb. 21, 2022

(87) PCT Pub. No.: WO2021/035215
PCT Pub. Date: Feb. 25, 2021

(65) Prior Publication Data

US 2022/0412280 A1 Dec. 29, 2022

Related U.S. Application Data

(60) Provisional application No. 62/890,343, filed on Aug. 22, 2019.

(51) Int. Cl.
*F01L 13/00* (2006.01)
*F02D 35/02* (2006.01)
(Continued)

(52) U.S. Cl.
CPC ...... *F02D 41/1406* (2013.01); *F01L 13/0005* (2013.01); *F02D 35/02* (2013.01);
(Continued)

(58) Field of Classification Search
CPC ........... F01L 13/0005; F01L 2013/001; F02D 41/0087; F02D 41/1498
(Continued)

(56) References Cited

U.S. PATENT DOCUMENTS 9,249,749 B2 2/2016 Brennan
9,650,978 B2 5/2017 Phillips
(Continued)

FOREIGN PATENT DOCUMENTS

CN 103670876 A 3/2014
CN 107110039 A 8/2017
(Continued)

OTHER PUBLICATIONS

Search Report and Written Opinion issued in related PCT/US2020/047637 dated Nov. 9, 2020 (pp. 12).
(Continued)

*Primary Examiner* — Erick R Solis
(74) *Attorney, Agent, or Firm* — Woodard, Emhardt, Henry, Reeves & Wagner, LLP

(57) ABSTRACT

A system and method for dynamically deactivating engine cylinders of an engine equipped with a cylinder deactivation system, where the system and method control torsional vibration in the engine while deactivating cylinders using a computer programed with a desired firing density and a controlled range of engine vibration frequencies. The computer dynamically determines a cylinder firing pattern that provides the desired firing density while optimizing a cost function norm in the controlled range of engine vibration frequencies. The cylinder deactivation system in the engine
(Continued)

is then controlled using the determined cylinder firing pattern.

19 Claims, 15 Drawing Sheets

(51) Int. Cl.

| | |
|---|---|
| ***F02D 41/00*** | (2006.01) |
| ***F02D 41/14*** | (2006.01) |
| ***F02D 41/28*** | (2006.01) |

(52) U.S. Cl.

CPC ..... *F02D 41/0087* (2013.01); *F02D 41/1498* (2013.01); *F02D 41/28* (2013.01); *F01L 2013/001* (2013.01); *F02D 2041/1433* (2013.01); *F02D 2041/288* (2013.01); *F02D 2250/28* (2013.01)

(58) Field of Classification Search

USPC ............................... 123/198 F, 481; 701/101

See application file for complete search history.

(56) References Cited

U.S. PATENT DOCUMENTS

| | | | | |
|---|---|---|---|---|
| 9,726,139 | B2 | 8/2017 | Beikmann | |
| 9,739,212 | B1 * | 8/2017 | Srinivasan | F02D 41/021 |
| 2013/0092128 | A1 | 4/2013 | Pirjaberi | |
| 2014/0190449 | A1 * | 7/2014 | Phillips | F02D 37/02 123/406.12 |
| 2016/0252023 | A1 * | 9/2016 | Srinivasan | F02D 41/2422 701/115 |
| 2017/0370308 | A1 | 12/2017 | Hashemi | |
| 2018/0202379 | A1 | 7/2018 | Nagashima | |
| 2018/0230919 | A1 * | 8/2018 | Nagashima | F02D 41/307 |
| 2018/0238248 | A1 | 8/2018 | Karnik et al. | |
| 2019/0024594 | A1 | 1/2019 | Shost | |
| 2021/0001832 | A1 * | 1/2021 | Phillips | F02D 41/023 |
| 2021/0199061 | A1 * | 7/2021 | Fuschetto | F02D 17/02 |
| 2022/0090548 | A1 * | 3/2022 | Wolk | F02D 41/403 |

FOREIGN PATENT DOCUMENTS

| | | |
|---|---|---|
| CN | 107664070 A | 2/2018 |
| DE | 10 2013 114 956 A1 | 7/2014 |
| DE | 10 2013 220 185 B4 | 2/2019 |

OTHER PUBLICATIONS

Machine translation of CN107110039A by PatDocs PDF on Aug. 21, 2023 (pp. 55).

Machine translation of CN107664070A by PatDocs PDF on Aug. 31, 2023 (pp. 20).

* cited by examiner

METHOD FOR DYNAMICALLY DETERMINING A FIRING PATTERN FOR AN ENGINE WITH DYNAMIC CYLINDER ACTIVATION AND A SYSTEM IMPLEMENTING THE METHOD

BACKGROUND

The present disclosure pertains generally to dynamically determining a firing pattern for operating an engine with dynamic cylinder activation.

Modern engines are generally reliant on aftertreatment systems for reduction of regulated vehicle-out emissions. However, diesel engine aftertreatment systems require elevated component temperatures, usually in excess of 200 C, for effective emissions reduction. Cylinder deactivation (CDA) has been demonstrated as a means to achieve fuel savings and improvements in aftertreatment thermal management at low-to-moderate load diesel engine operating conditions, via lower pumping work and air-to-fuel ratios, respectively. Applicants are unaware of any applications of diesel engine CDA in production ground vehicles.

Experiments published in 2018 demonstrated that implementation of CDA below a brake effective mean pressure (BMEP) of 3 bar resulted in up to 3.4% fuel savings over the heavy duty federal test procedure (HD-FTP), and predicted 4%-35% fuel savings over the Orange County Bus and NREL Port Drayage cycles. Other experiments have demonstrated that lower exhaust flow rates during CDA enabled slower cool-down of the aftertreatment components by up to 34 minutes, while realizing 40% and 16% fuel savings during extended idle and low load creep operation, respectively. Others have observed that the fundamental forcing frequencies during CDA were lower than baseline engine operation, and proposed an engine speed-dependent recipe for fixed CDA for managing torsional vibration below 3 bar BMEP.

Dynamic cylinder activation (DCA), a variant of diesel engine CDA where the set of firing and non-firing cylinders vary on a cycle-by-cycle basis, has been demonstrated to achieve similar fuel economy and aftertreatment thermal management benefits as fixed CDA while enabling greater control over the driveline torsional vibration content. FIG. 1 shows that similar turbine-outlet temperatures and fuel savings are achieved by two DCA firing patterns compared to fixed CDA with the equivalent number of active cylinders at curb idle operating condition (brake mean effective pressure (BMEP) of 1.3 bar at 800 rev/min).

Strategies similar to diesel engine DCA have been studied for gasoline engines. Dynamic skip fire (DSF) is a variant of gasoline engine CDA, during which a different number and combination of cylinders are deactivated each engine cycle based on engine load. DSF has been shown to provide a 7%-15% reduction in carbon dioxide emissions, and 10%-20% fuel economy improvement in gasoline engines as a result of a greater number of firing patterns allowing reduced usage of throttling to maintain stoichiometric air-to-fuel ratios at different loads. DSF is expected to be implemented in production in the 2019 Chevrolet Silverado.

Prior related firing pattern selection strategy efforts have relied on extensive use of look-up tables, where the optimum firing pattern for a given firing density is chosen from a set of predefined firing patterns with desired noise, vibration and harshness (NVH) characteristics. Multiple, or multi-dimensional, look-up tables were proposed to take into account the differences in NVH characteristics caused by variations in gear ratios, engine speed and other engine operating conditions. One prior art approach stores the vibration characteristics, including amplitude, frequency and phase of vibration, for a set of firing patterns, and the firing pattern satisfying a set of predetermined criteria at a given engine operating condition is executed. Another prior art approach uses predetermined sequences of firing patterns, in combination with a transition parameter, for improved transient vibration during "variable CDA". These approaches not only require extensive calibration for a given engine configuration, but are also not applicable to different families of engines.

Yet another prior art strategy to eliminate unfavorable torsional vibration during skip fire engine operation applies an external smoothing torque by an energy storage/release device, in addition to choice of firing patterns from a predefined set with desirable NVH characteristics. Another prior art approach is to transition from one mode of fixed CDA to another such that the vibrations resulting from such transitions are countered using active mounts. However, such approaches for driveline vibration management require energy storage/release devices or active mounts which are not present on the vast majority of powertrains.

SUMMARY

The present disclosure pertains generally to dynamically determining a firing pattern for operating an engine with dynamic cylinder activation.

This application presents a physical model-based algorithm to design the sequence of firing and non-firing events (firing patterns) for diesel engine dynamic cylinder activation (DCA), to minimize torsional vibration content over a user-defined frequency range, given the firing density, maximum length of firing pattern and engine speed. The algorithm utilizes a phase-angle approach to determine the unbalanced engine orders for a given firing pattern, and optimizes the firing pattern via mixed-integer programming. The firing pattern can be designed to minimize either the maximum deviation in flywheel angular acceleration over the user-defined frequency range, the number of frequencies at which unbalanced vibration content exists, or a sum/root-sum-square of the amplitudes at the unbalanced frequencies. This algorithm is also amenable to different piston-cylinder geometries and number of cylinders.

The algorithm was also extended to a more constrained version of DCA, when CDA hardware is implemented only on a subset of cylinders of the engine, such that the remainder of the cylinders remain active every engine cycle. It is demonstrated that the vibration content can be minimized, however to a smaller extent, over the defined range of 'undesirable' frequencies.

DETAILED DESCRIPTION

Figure 1:
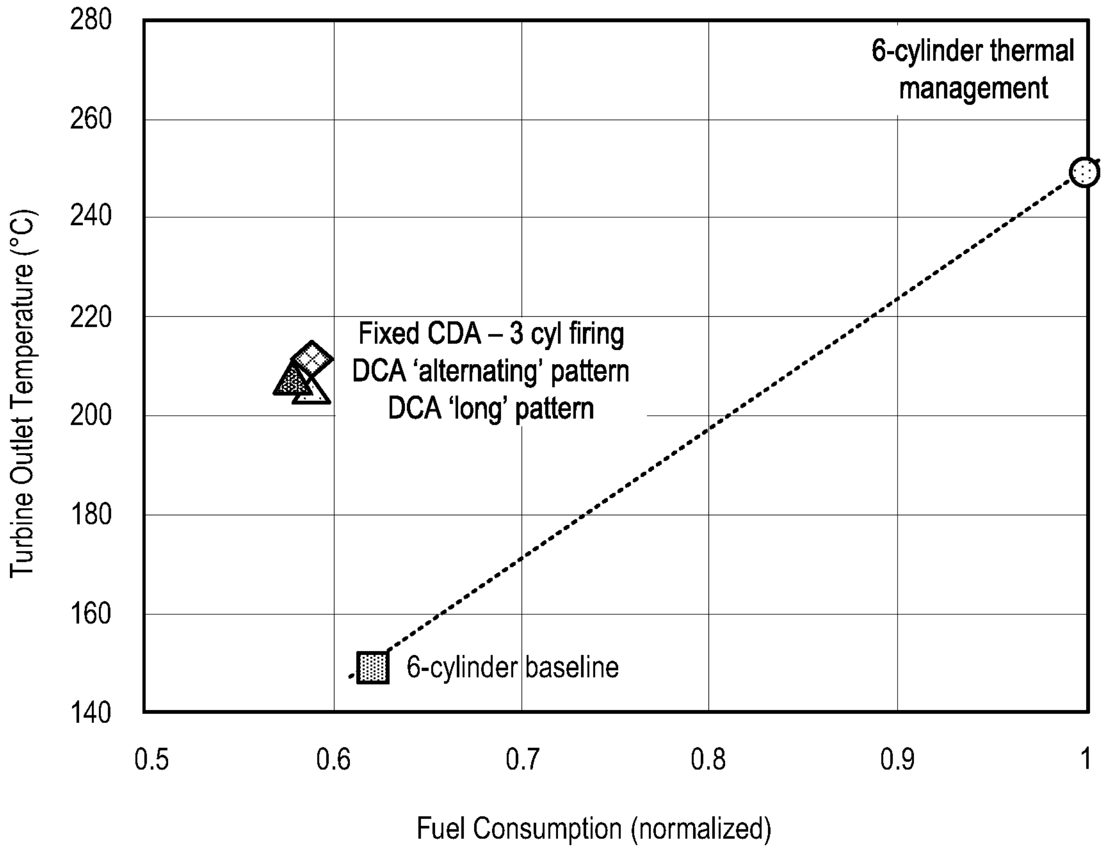
FIG. 1 is a plot of Fuel Consumption vs. Turbine Outlet Temperature (° C.) for a 6-cylinder engine comparing a DCA-'long pattern' and DCA-'alternating pattern,' with a fixed CDA (3 cylinders firing) at steady state curb idle operation (800 RPM, 1.3 bar BMEP).

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail; although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Applicants conclude that selecting appropriate firing patterns during DCA can significantly reduce the torsional vibration amplitudes at the forcing frequencies as well as move the forcing frequencies away from the drivetrain resonant frequencies. This application presents a data-informed physics-based algorithm to design appropriate firing patterns during DCA operation to enable torsional vibration management over a user-defined controlled range of 'undesirable' forcing frequencies. Typical ranges of undesirable frequencies lie between 0 Hz and 20 Hz, where (i) firing frequencies are near typical drivetrain resonance frequencies (such as within 5% of the drivetrain resonance frequencies) and (ii) humans are more likely to be bothered by resulting vehicle vibration.

Figure 2:
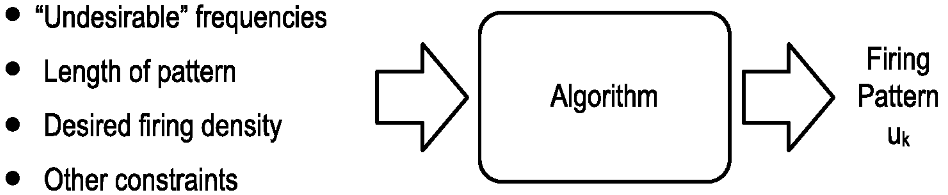
FIG. 2 is a flow chart showing how a firing pattern can be computed with an Algorithm.

This application presents a data-informed physics-based algorithmic approach to design firing patterns/sequences during DCA operation to minimize crankshaft torsional vibrations in user-defined frequency ranges, given desired firing density and maximum length of firing pattern, as shown in FIG. 2. This model-based strategy is generalizable to any engine piston-cylinder arrangement (inline-/V-configuration for any number of cylinders) and different drivetrain configurations.

Order analysis can be an effective tool to analyze vibration of rotating components. The frequency of an event is defined as the number of times a repeating event occurs per unit time. Similarly, an order captures the number of times a repeating event occurs per revolution of a rotating component. An engine order is defined as the number of times a repeating event, or sequence of events, occur during one engine revolution. A repeating event occurring at a frequency of f Hz at an engine speed of Ω rev/min (RPM) corresponds to an engine order of 60 f/Ω. Conversely, an engine order of $O_E$ at an engine speed of Ω RPM corresponds to a frequency of $O_E$ Ω/60 Hz.

A "repeating event," in the context of this application, is a series of firing and non-firing events that repeat periodically in the firing pattern. The length of the repeating event or sequence of events is referred to as "repeating period". The longest unique repeating period of a firing pattern corresponds to the fundamental engine order at which vibration content exists for that firing pattern, with higher frequency vibration content existing at integral multiples of the fundamental engine order.

Figure 3:
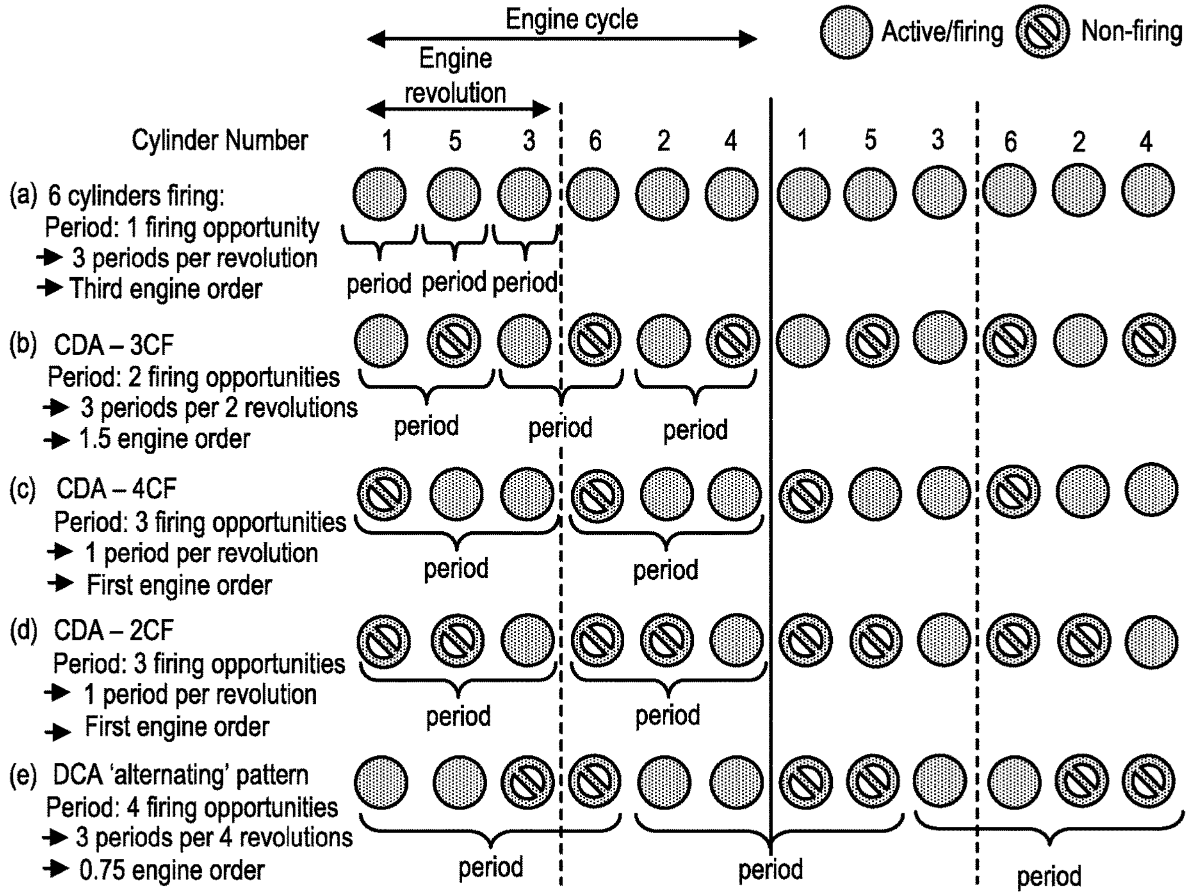
FIG. 3 is a cylinder diagram showing an order analysis for different fixed CDA and DCA modes on a 4-stroke, 6-cylinder engine.
Figure 4:
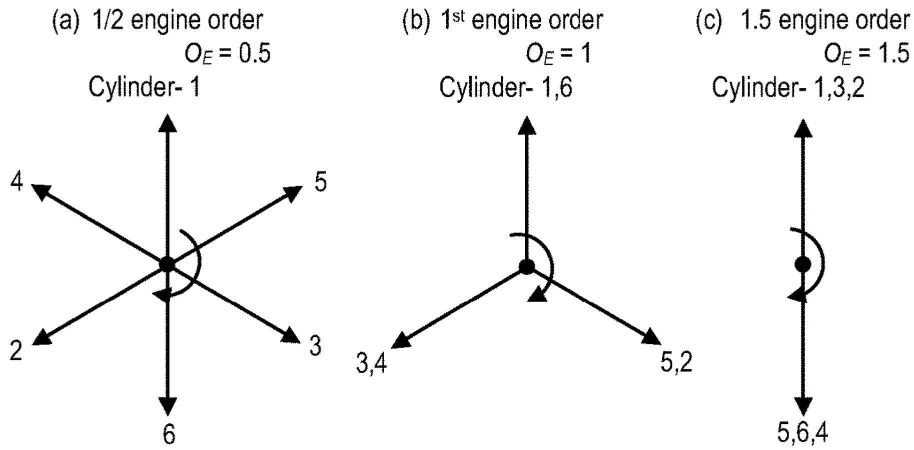
FIG. 4 shows phase angle diagrams for (a) Engine order number=0.5, (b) Engine order number=1, (c) Engine order number=1.5 and (d) Engine order number=3 for a six-cylinder engine with firing order 1-5-3-6-2-4, with each vector direction representing a cylinder firing opportunity.

FIG. 3 illustrates an engine order analysis for different modes of operation in a six-cylinder engine with cylinder firing order '1-5-3-6-2-4'. Conventional six-cylinder operation has six firing events occurring during one cycle, as shown in FIG. 3(*a*). The repeating period (length of the longest unique repeating sequence) during six-cylinder operation is one cylinder (one firing event). This operation has six repeating periods in one engine cycle, or three repeating periods per engine revolution. Therefore, the fundamental engine order in six-cylinder operation is the third order.

FIG. 3(*b*) represents the firing sequence for CDA-3CF, where three of the six cylinders are deactivated, such that every alternate cylinder in the firing order of the engine is active. The firing sequence of the engine becomes '1-x-3-x-2-x' when cylinders 1, 2 and 3 are active. The repeating period is two cylinders, consisting of an active cylinder followed by a non-firing cylinder. Three repeating periods exist during one engine cycle (two engine rotations) and therefore, the fundamental engine order is 1.5.

FIGS. 3(*c*) and 3(*d*) demonstrate the engine order analysis during CDA-4CF operation (firing sequence—'x-5-3-x-2-4') and CDA-2CF operation (firing sequence—'x-x-3-x-x-4'), respectively. The repeating period in both cases is three cylinders—consisting of two active cylinders followed by one non-firing cylinder during CDA-4CF operation, and two non-firing cylinders followed by one active cylinder during CDA-2CF operation, as shown in FIG. 3(*c*) and FIG. 3(*d*), respectively. Each engine rotation consists of one repeating period, and therefore, the fundamental engine order is 1 for both CDA-2CF and CDA-4CF.

FIG. 3(*e*) illustrates an alternating pattern DCA with a repeating period of four cylinders, consisting of two consecutive firing events followed by two consecutive non-firing events. The fundamental engine order for this pattern is 0.75, as three repeating periods occur during two engine cycles (four engine rotations).

The longest repeating period possible during fixed CDA in a six-cylinder engine is six cylinders, as the same firing sequence repeats at least once every engine cycle. This corresponds to a fundamental engine order of 0.5 (as one period repeats every two engine rotations), which is the lowest order achievable during fixed CDA operation. Examples of firing strategies consistent with 0.5 fundamental engine order include CDA-1CF (e.g. firing sequence—x-x-3-x-x-x) and CDA-5CF (e.g. firing sequence—1-5-x-6-2-4). Other examples of 0.5 fundamental engine order operation are 'non-standard' modes of fixed CDA involving firing in a different combination of cylinders than those shown in FIGS. 3(*b*)-3(*d*), including, for example, CDA-3CF with firing sequence 1-x-x-6-2-x, CDA-2CF with firing sequence 1-x-x-x-2-x and CDA-4CF with firing sequence 1-5-3-x-2-x. DCA, where a different set of cylinders can be deactivated each engine cycle, can exhibit lower engine orders than 0.5, as the repeating period of a firing sequence can be longer than six cylinders.

Table 1 summarizes the repeating periods corresponding to different engine orders, both for a six-cylinder engine and for a general N-cylinder engine. An engine order of $O_E$ corresponds to a repeating pattern occurring $1/O_E$ times in one engine revolution, consisting of N/2 cylinders in a 4-stroke N-cylinder engine. One repeating period is therefore N/2 $O_E$ cylinders long.

TABLE 1

| Engine Order | Number of engine revolutions per repeating period | Number of firing opportunities per repeating period (6-cylinder engine) | Number of firing opportunities per repeating period (N-cylinder engine) |
|---|---|---|---|
| 3 | 1/3 | 1 | N/6 |
| 1.5 | 2/3 | 2 | N/3 |
| 1 | 1 | 3 | N/2 |
| 0.5 | 2 | 6 | N |
| $O_E$ | $1/O_E$ | $3/O_E$ | $N/(2O_E)$ |

A phase angle diagrams approach is a method to represent the torsional vibration content of the engine at a given order. Each cylinder, or 'firing opportunity', can be represented as a vector such that all the firing opportunities for a given engine order are equally spaced (phased) within a circle in the cylinder firing order. The magnitude of the vector for a firing event can be 1, and the magnitude for a non-firing event can be 0. The sum of all the vectors in the phase angle diagram for a given engine order represents the presence/absence of unbalanced vibration content at that order. A zero vector sum indicates that vibration content is balanced at that order while a non-zero vector sum represents unbalanced vibration content at that order.

Figure 5:
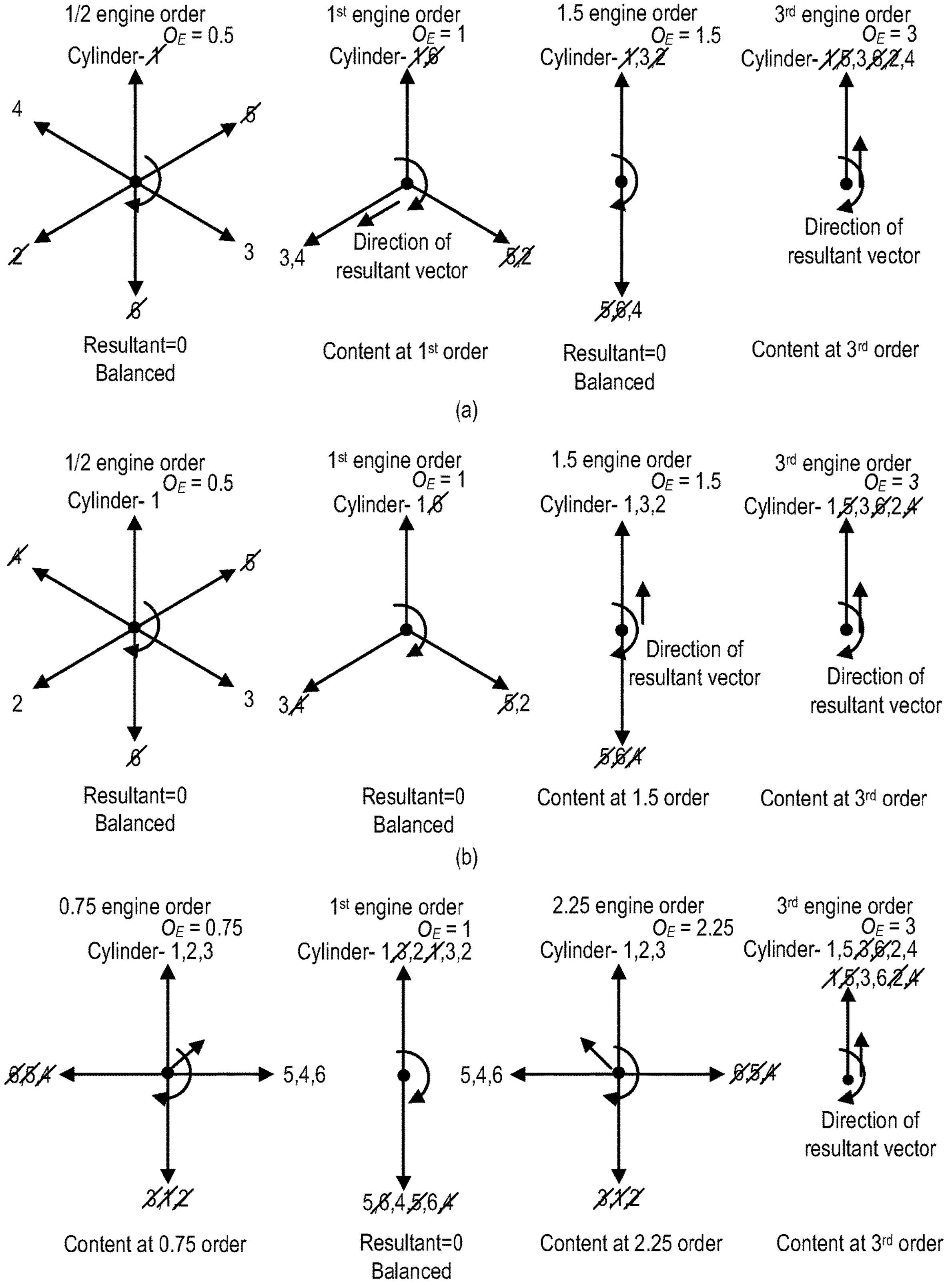
FIG. 5 shows phase angle diagrams for (a) CDA-2CF, (b) CDA-3CF, and (c) DCA alternating pattern (50% firing density).

The number of equally phased vectors is equal to the number of firing opportunities present within one repeating period of an engine order. For example, the engine order of 0.5, which has six firing opportunities per repeating period, as shown in Table 1, has six vectors with a phase of 60 between consecutive vectors, as shown in FIG. 5(*a*). FIG. 5(*b*) shows the phase angle diagram for engine order of 1, which has three vectors, separated by 120°. FIG. 5(*c*) shows that an engine order of 1.5 can be represented by two vectors, phased by 180°, and FIG. 5(*d*) shows that the engine order of 3 is represented by only one vector in the circle.

FIG. 5 also demonstrates the engine order content of conventional six-cylinder operation, where firing occurs at every opportunity. Each vector in the phase angle diagram is represented by a unit vector with appropriate phase. The resultant vector for engine orders of 0.5, 1 and 1.5 is zero, as the equally phased vectors cancel each other out, while the resultant vector at third order is non-zero. Therefore, conventional six-cylinder operation has only third order frequency content, consistent with FIG. 3. It should be noted from the phase angle diagrams that vibration content at third order can never be eliminated in a six-cylinder engine, as a zero resultant vector cannot be achieved with non-zero vector components in the same direction.

FIG. 5(*a*) shows the phase angle diagram for CDA-2CF, with cylinders 3 and 4 firing. The vectors corresponding to firing and non-firing cylinders have magnitudes of 1 and 0, respectively. FIG. 5(*a*) shows that 0.5- and 1.5-engine orders have zero resultant vectors, while first and third engine orders have non-zero magnitude. This result appears to be consistent with FIG. 3, which shows that CDA-2CF exhibits first order vibration. The phase angle plot for CDA-3CF (FIG. 5(*b*)) shows that the resultant vector has zero magnitude at engine orders of 0.5 and 1, and non-zero magnitude at engine orders of 1.5 and 3, consistent with FIG. 3. FIG. 5(*c*) shows DCA alternating patterns with 50% firing density, including non-zero resultant vectors at engine orders of 0.75, 2.25 and 3. The resultant vector magnitude at first engine order for this strategy becomes zero (and is balanced) only by alternating every two engine cycles.

Similar analysis can be extended to strategies other than CDA and DCA, for example, cylinder cutout, reverse breathing and ventilated cylinder cutout, as long as all firing and non-firing gas exchange, compression and expansion processes remain consistent across all firing and non-firing cylinders, respectively.

Each vector in the phase angle diagrams can be mathematically represented by a complex number of unit magnitude. An engine order of $O_E$ has $N/2O_E$ firing opportunities per repeating cycle, as shown in Table 1, and therefore, there are $N/2O_E$ vectors in the phase angle diagram. The phase shift between consecutive vectors, in radians, can be represented by $\phi$, as shown by Equation 1.

$$\phi = \frac{360°}{\left(\frac{N}{2O_E}\right)} = \frac{720°}{N} \times O_E = \frac{4\pi}{N} O_E \tag{1}$$

The phase of the $k^{th}$ firing opportunity, for an engine order $O_E$ can be represented by k, as shown in Equation 2.

$$\phi_k = \frac{4\pi}{N} O_E k \tag{2}$$

The $k^{th}$ phase angle vector for engine order $O_E$, which is of unit length for a firing cylinder and zero length for a non-firing cylinder, may be represented by a complex number $x_k$, as shown by Equation 3. The firing decision for the $k^{th}$ firing opportunity, $u_k$, is 1 for an active/firing cylinder and 0 for a non-firing cylinder.

$$x_k = u_k e^{i\phi k} = u_k e^{i\frac{4\pi}{N} O_E k};\ u_k \in \{0, 1\} \tag{3}$$

The resultant vector at an engine order $O_E$, which is the sum of all the individual vectors (complex numbers) $x_k$ over the maximum length of the firing pattern, w, is represented by $S_{O_E}$, as shown by Equation 4. A non-zero $S_{O_E}$ indicates that unbalanced vibration content is present at engine order $O_E$.

$$S_{O_E} = \left|\sum_{k=1}^{w} x_k\right| = \left|\sum_{k=1}^{w} u_k e^{i\frac{4\pi}{N} O_E k}\right| \tag{4}$$

The magnitude of the sum at every engine order is not always proportional to the amplitude of vibration content present at that engine order. Characteristics of the engine driveline, including properties of the crankshaft, flywheel and driveshaft, properties and locations of engine mounts, shape of the in-cylinder pressures during combustion and the relevant location in the driveline where torsional analysis is performed, determine the frequency response of torsional vibration. The sum $S_{O_E}$ is therefore multiplied with a weighting factor $W_{O_E}$, at each relevant engine order, to account for the relative variations in driveline response between engine orders.

The weighting factor, $W_{O_E}$, for this work, was chosen based on the Fast Fourier Transform (FFT) of deviation of flywheel angular acceleration from mean. Similar weighting functions can be developed to capture other vibration modes including, for example, angular acceleration of driveshaft, vertical seat vibration and steering wheel vibration. The $W_{O_E}$ implemented in this work was obtained using the in-cylinder pressure trace shown in FIG. 12. Variations in in-cylinder pressure caused by injection timing, quantity of injection, boost pressure, engine speed etc. result in variations in $W_{O_E}$.

The longest repeating period for a firing pattern of length w is w cylinders, which corresponds to the lowest possible engine order of N/2w for a general N-cylinder engine. Vibration content can be defined only at integral multiples of the lowest engine order, and therefore, the sum $S_{O_E}$ is calculated only at engine orders that are integral multiples of N/2w.

Figure 6:
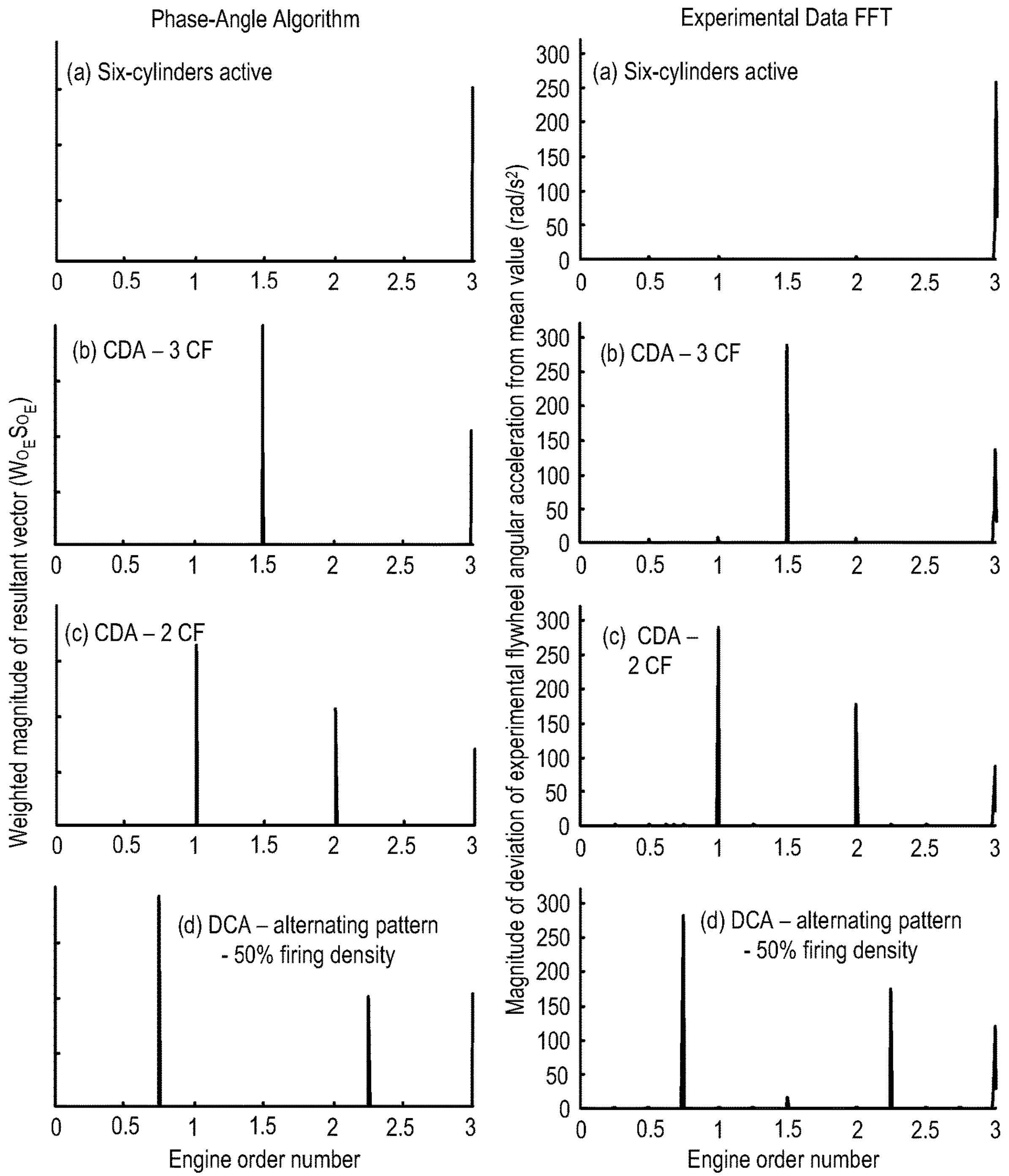
FIG. 6 is a plot of the engine orders at which there is a non-zero vector sum and the relative magnitude of the peaks obtained using the phase-angle approach (shown on the left) compared to the experimental data of flywheel angular acceleration (shown on the right) for (a) six-cylinder operation, (b) CDA-3CF, (c) CDA-2CF and (d) DCA with alternating patter.

The frequencies at which vibration content exists can be determined by calculating the vector sum $S_{O_E}$, at all relevant engine orders in the frequency range of interest, and multiplying the sum with a weighting factor $W_{O_E}$. FIGS. 6(*a*)-6(*d*) compare the weighted resultant vector sum ($W_{O_E}$, $S_{O_E}$) obtained from the phase angle algorithm with the FFT of experimentally obtained flywheel angular acceleration for (a) six-cylinder operation, (b) CDA-3CF, (c) CDA-2CF, and (d) DCA 'alternating pattern' with 50% firing density, respectively. FIG. 6 confirms that the weighted phase angle sum accurately captures the engine orders at which vibration content exists, and the relative magnitudes of the peaks among the orders. A non-zero weighted vector sum at an engine order of 3 for six-cylinder operation in FIG. 6(*a*), orders of 1.5 and 3 for CDA-3CF in FIG. 6(*b*), orders of 1, 2 and 3 for CDA-2CF in FIG. 6(*c*) and orders of 0.75, 2.25 and 3 for DCA with alternating pattern in FIG. 6(*d*), consistent with experimental data.

The objective of the optimization problem can be to reduce the magnitude of the weighted resultant vector sum ($W_{O_E} S_{O_E}$) at all relevant engine orders $\{O_E\}$ corresponding to any number of user-defined frequency ranges. The cost function (J) can be defined as the vector norm of the stacked weighted sum at all relevant engine orders, as represented by Equation 5. The firing pattern $u_K$, is the optimization variable to minimize the cost function.

$$J_\alpha = \left\| \begin{bmatrix} W_{O_{E,1}} \left|\sum_{k=1}^{w} u_k e^{i\frac{4\pi}{N} O_{E,1} k}\right| \\ W_{O_{E,2}} \left|\sum_{k=1}^{w} u_k e^{i\frac{4\pi}{N} O_{E,2} k}\right| \\ \cdots \\ \cdots \end{bmatrix} \right\|_\alpha \tag{5}$$

An appropriate α-norm can be chosen for the cost function depending on the desired behavior. A 0-norm in the cost function ($J_0$) minimizes the number of engine orders at which non-zero vibration content exists in the relevant engine order range. A 1-norm in the cost function ($J_1$) minimizes the sum of the weighted resultant vector magnitudes at relevant engine orders. A 2-norm in the cost function ($J_2$) minimizes the root-mean-square of the weighted resultant vector magnitudes at relevant engine orders. An infinity norm in the cost function ($J^\infty$) minimizes the maximum magnitude of the weighted resultant vectors over the relevant engine orders. These example candidate cost functions—$J_0$, $J_1$, $J_2$ and $J^\infty$—are shown in Equation 6.

$$J_0 = \underset{O_E}{num}\{W_{O_{E,j}} S_{O_{E,j}} \neq 0\} \tag{6a}$$

$$J_1 = \sum_{j=1}^{n} \left(W_{O_{E,j}} S_{O_{E,j}}\right) \tag{6b}$$

-continued $$J_2 = \sqrt{\sum_{j=1}^{n}\left(W_{O_{E,j}} S_{O_{E,j}}\right)^2} \tag{6c}$$

$$J_\infty = \max_{O_E}\left(W_{O_{E,j}} S_{O_{E,j}}\right) \tag{6d}$$

The optimization of any of the cost functions described above is subject to the following constraints.

The user-defined desired firing density ($P_{firing}$) is met at the end of the pattern.

The pattern length w may be iteratively chosen based on the firing density and torsional vibration requirements. Longer patterns tend to exhibit low amplitude vibration content at multiple frequencies while shorter patterns show vibration at distinct frequencies.

The most number of consecutive non-firing events is limited, to reduce fluctuations in engine speed and avoid potential engine stall. At least one firing event can be constrained to occur every six consecutive cylinders (one engine cycle). This constraint may be modified depending upon the properties of the powertrain, including flywheel inertia, friction, engine speed, etc.

The constrained can be formulated as follows.

The cost function and constraints for this optimization problem can be summarized, as shown in Equation 7. The variables used in the optimization are summarized in Table 2.

$$\min_u J_\alpha = \left\| \begin{bmatrix} W_{O_{E,1}} \left| \sum_{k=1}^{w} u_k e^{i\frac{4\pi}{N} O_{E,1} k} \right| \\ W_{O_{E,2}} \left| \sum_{k=1}^{w} u_k e^{i\frac{4\pi}{N} O_{E,2} k} \right| \\ \cdots \\ \cdots \end{bmatrix} \right\|_\alpha \tag{7a}$$

subject to $$\frac{1}{w}\sum_{k=1}^{w} u_k = \rho_{firing};\ u_k \in \{0, 1\} \tag{7b}$$

$$\sum_{k=j}^{j+5} u_k > 0;\ j = 1, 2, \ldots, w \tag{7c}$$

TABLE 2

| Symbol | Description |
|---|---|
| i | Imaginary number ($\sqrt{-1}$) |
| j | Index number of engine order in the user-defined range of engine orders |
| k | Index number of firing event in a given engine order |
| N | Number of cylinders on the engine |
| $J_\alpha$ | Cost function using α norm |
| $O_{E,j}$ | Order number of $j^{th}$ relevant engine order |
| $W_{O_E}$ | Weighting factor corresponding to engine order $O_E$ |
| w | Maximum, length of firing pattern |
| $u_k$ | Firing decision for $k^{th}$ firing opportunity (Non-firing event ⇔ $u_k = 0$; Firing event ⇔ $u_k = 1$) |
| $\rho_{firing}$ | Firing density |

This optimization problem is a "mixed integer programming" problem. It can be solved using the YALMIP toolbox and Gurobi solver in MATLAB. The set of undesirable engine orders, desired firing density and maximum length of the firing pattern are the inputs to the optimization problem, and the sequence of firing/non-firing events (firing pattern) $u_k$ is the optimized output.

To demonstrate the implementation approach, and benefits of, this strategy, the optimization problem (Equations 7a-7c) was solved for various scenarios, with results discussed below. The FFT of the flywheel angular acceleration from the resulting optimized firing pattern was simulated using an engine driveline model, which is described in greater detail below. All described simulations described were performed at an engine speed of 800 RPM, for an inline-six-cylinder engine geometry. (Engine speed 0=800 RPM, Number of cylinders N=6.)

The following inputs were used with a first case model with three sets of 'unfavorable' frequencies:

Frequency range for minimization of vibration content: (a) [1 Hz, 18 Hz], (b) 5.4 Hz and 17 Hz with a factor of $\sqrt{(2)}$, (c) (0 Hz, 40 Hz)

Desired firing density $p_{firing}$=50%

Length of firing pattern w=36 cylinders (6 engine cycles)

Cost function norm: Infinity-norm

The lowest engine order corresponding to a pattern length of 36 cylinders in a 6-cylinder engine is $$\frac{N}{2w} = 0.083.$$

The engine orders at which vibration content exists are integral multiples of 0.083.

The user-defined frequency range of 1 Hz-18 Hz in Case (a) corresponds to the engine order range of 0.075-1.35 at Ω=800 RPM. The engine orders relevant to the firing pattern design algorithm, which are multiples of 0.083 within the user-defined engine order range are {0.0833, 0.1667, . . . 0.1.25, 1.333}. The corresponding cost function and constraints are represented by Equations 8a, 8b and 8c.

$$\min_u J_\infty = \left\| \begin{bmatrix} W_{0.0833} \left| \sum_{k=1}^{36} u_k e^{i\frac{2\pi}{3}(0.0833)k} \right| \\ W_{0.1667} \left| \sum_{k=1}^{36} u_k e^{i\frac{2\pi}{3}(0.1667)k} \right| \\ \cdots \\ \cdots \\ W_{1.333} \left| \sum_{k=1}^{36} u_k e^{i\frac{2\pi}{3}(1.333)k} \right| \end{bmatrix} \right\|_\infty \tag{8a}$$

$$\frac{1}{36}\sum_{k=1}^{36} u_k = 0.5;\ u_k \in \{0, 1\} \tag{8b}$$

$$\sum_{k=j}^{j+5} u_k > 0;\ j = 1, 2, \ldots, 36 \tag{8c}$$

Figure 7:
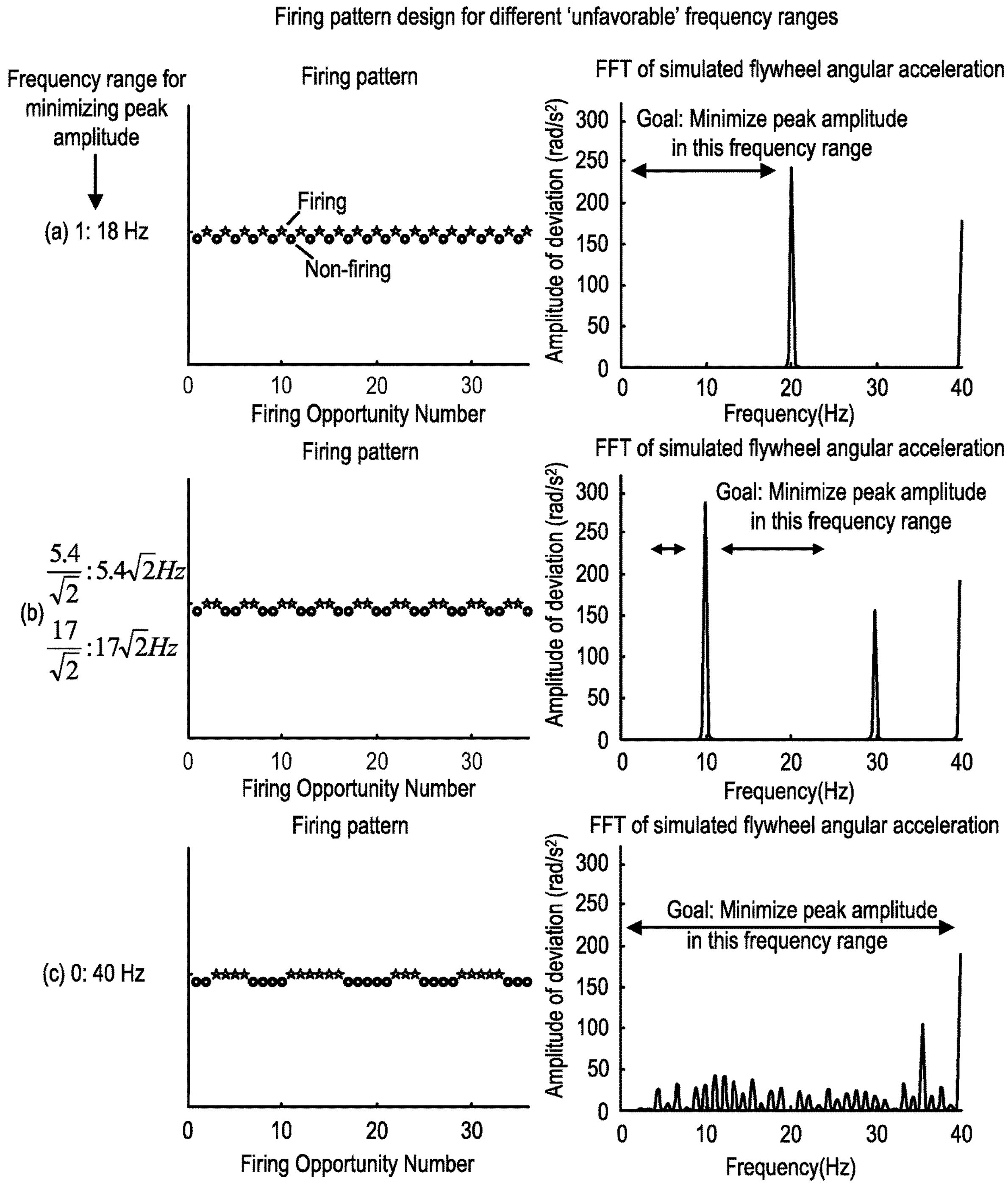
FIG. 7 is a plot of optimized DCA firing patterns and corresponding FFT of simulated flywheel angular acceleration showing vibration content at frequency ranges of (a) 1 Hz-18 Hz, (b) 3.8 Hz-7.6 Hz, 12 Hz-24 Hz, and (c) 0 Hz-40 Hz at 800 RPM, for 50% firing density and pattern length w of 36 cylinders.

The optimized firing pattern chosen by the algorithm for the inputs defined in Case (a) corresponds to CDA-3CF operation, where every active/firing event is followed by a non-firing event, as shown in FIG. 7(*a*). This firing pattern has vibration content at 20 Hz (corresponding to an engine order of 1.5 at 800 RPM), and its multiples as harmonics. This optimized firing pattern completely eliminates vibration content in the range of 'undesirable' frequencies (1 Hz 18 Hz) as the lowest frequency component of the flywheel acceleration lies at 20 Hz.

The user-defined frequency range in Case (b)—[5.4/√2:5.4√2, 17/√2:17/√2] Hz—corresponds to the engine order range of [0.2864:0.5364, 0.9016:1.7349] at Ω=800 RPM. The relevant engine orders for the optimization problem are {0.333, . . . , 0.5, 0.8333, . . . , 1.6667}, which are multiples of 0.083 within the engine order range. The cost function for Case 1(b) is shown in Equation 9. The constraints are the same as those shown in Equations 8(b) and 8(c).

$$\min_u J_\infty = \left\| \begin{bmatrix} W_{0.333}\left|\sum_{k=1}^{36} u_k e^{i\frac{2\pi}{3}(0.333)k}\right| \\ \cdots \\ \cdots \\ W_{0.5}\left|\sum_{k=1}^{36} u_k e^{i\frac{2\pi}{3}(0.5)k}\right| \\ W_{0.833}\left|\sum_{k=1}^{36} u_k e^{i\frac{2\pi}{3}(0.833)k}\right| \\ \cdots \\ \cdots \\ W_{1.667}\left|\sum_{k=1}^{36} u_k e^{i\frac{2\pi}{3}(1.667)k}\right| \end{bmatrix} \right\|_\infty \tag{9}$$

The optimal firing pattern for the inputs defined in Case (b) corresponds to DCA with alternating pattern, where every two consecutive active/firing events are followed by two consecutive non-firing events, as shown in FIG. 7(*b*). This firing pattern has vibration content at 10 Hz and 30 Hz (corresponding to engine orders of 0.75 and 2.25, respectively at 800 RPM). This optimized firing pattern completely eliminates vibration content in the range of 'undesirable' frequencies (3.8 Hz-7.6 Hz, 12 Hz-24 Hz), as 10 Hz and 30 Hz, where vibration content exists, are outside the undesirable range.

The frequency range of 0 Hz-40 Hz in case 1(c) corresponds to the engine order range of 0-3 at Ω=800 RPM. The relevant engine orders for the optimization problem are {0.0833, 0.1667 . . . , 2.9167}, which are multiples of 0.083 within the engine order range. The cost function for Case 1(c) is shown in Equation 10. The constraints are the same as those shown in Equation 8(b) and 8(c).

$$\min_u J_\infty = \left\| \begin{bmatrix} W_{0.0833}\left|\sum_{k=1}^{36} u_k e^{i\frac{2\pi}{3}(0.0833)k}\right| \\ W_{0.1667}\left|\sum_{k=1}^{36} u_k e^{i\frac{2\pi}{3}(0.1667)k}\right| \\ \cdots \\ \cdots \\ W_{2.9167}\left|\sum_{k=1}^{36} u_k e^{i\frac{2\pi}{3}(2.9167)k}\right| \end{bmatrix} \right\|_\infty \tag{10}$$

The optimal firing pattern for Case 1(c) corresponds to a DCA pattern with a pattern length of 36 cylinders, as shown in FIG. 7(*c*). The FFT of the flywheel angular acceleration shows low magnitude vibration content 'spread' across multiple frequencies. Vibration content can be minimized in the user-defined frequency range of 0 Hz-40 Hz, but not completely eliminated.

The following inputs were used with a second case model with three desired firing densities of 20%, 40% and 80%:

Frequency range for minimization of vibration content: (0 Hz-40 Hz)

Desired firing density $P_{firing}$=(a) 20%, (b) 40%, (c) 80%

Length of firing pattern w=30 cylinders (5 engine cycles)

Cost function norm: Infinity-norm

The lowest engine order corresponding to a pattern length of 30 cylinders in a 6-cylinder engine is $$\frac{N}{2w} = 0.1.$$

The engine orders at which vibration content exists are integral multiples of 0.1. The user-defined frequency range of 0 Hz-40 Hz corresponds to the engine order range of 0-3 at Ω=800 RPM. The engine orders relevant to the firing pattern design algorithm, which are multiples of 0.1 within the user-defined engine order range are {0.1, 0.2, . . . , 2.8, 2.9}. The corresponding cost function and constraints are shown in Equation 11.

$$\min_u J_\infty = \left\| \begin{bmatrix} W_{0.1}\left|\sum_{k=1}^{36} u_k e^{i\frac{2\pi}{3}(0.1)k}\right| \\ W_{0.2}\left|\sum_{k=1}^{36} u_k e^{i\frac{2\pi}{3}(0.2)k}\right| \\ \cdots \\ \cdots \\ W_{2.9}\left|\sum_{k=1}^{36} u_k e^{i\frac{2\pi}{3}(2.9)k}\right| \end{bmatrix} \right\|_\infty \tag{11a}$$

subject to $$\frac{1}{30}\sum_{k=1}^{30} u_k = (a)0.2,\ (b)0.4,\ (c)0.8;\ u_k \in \{0, 1\} \tag{11b}$$

$$\sum_{k=j}^{j+5} u_k > 0;\ j = 1, 2, \ldots, 30 \tag{11c}$$

Figure 8:
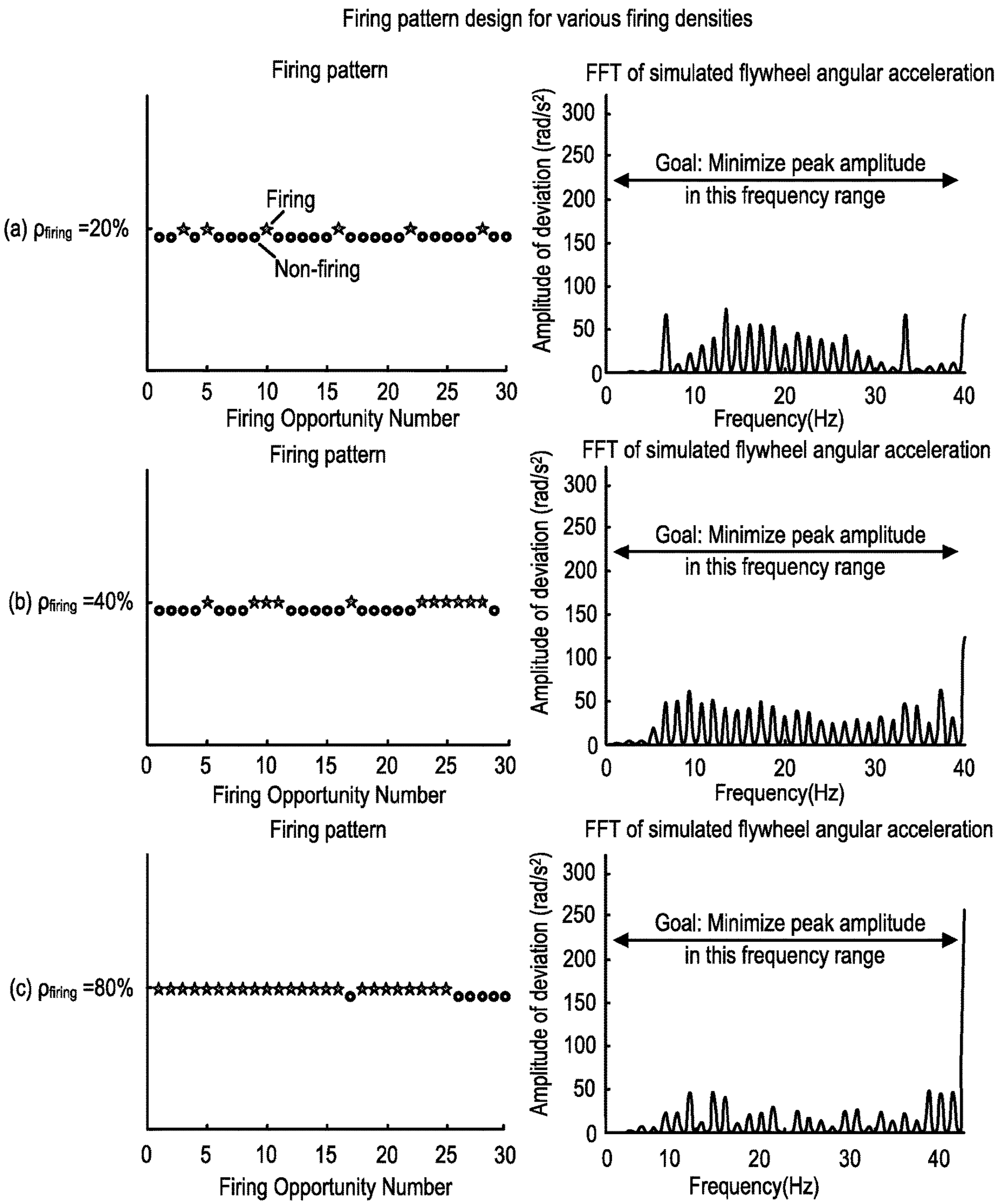
FIG. 8 shows plots of optimized DCA firing patterns and corresponding FFT of simulated flywheel angular acceleration minimizing the maximum magnitude of vibration content at all engine orders up to (not including) third order, at 800 RPM, for firing densities of (a) 20%, (b) 40% and (c) 80%, and pattern length w of 30 cylinders.

FIGS. 8(*a*), 8(*b*) and 8(*c*) show the optimized firing patterns and the corresponding FFT of the simulated flywheel angular acceleration for the three desired firing densities of 20%, 40% and 80%, respectively. The firing patterns chosen by the algorithm have a pattern length of 5 cycles for all three cases. Vibration content can be minimized, but not completely eliminated, in the range of 'undesirable' frequencies (0 Hz-40 Hz), and FIGS. 8(*a*)-8(*c*) show that vibration content is spread across all frequencies between 0 Hz and 40 Hz.

The examples shown above used the infinity-norm in the optimization problem to minimize the maximum magnitude of flywheel angular acceleration over the defined frequency range. The example described below demonstrates the effect of the norm on design of the optimum firing pattern. Consider the following inputs to a third case model:

Length of firing pattern w=30 cylinders (5 engine cycles)

Cost function norm: (a) 0-norm, (b) 1-norm, (c) 2-norm, (d) Infinity-norm

The engine orders relevant to the firing pattern design algorithm are {0.1, 0.2, . . . , 2.8, 2.9}, as shown above for Example 2. The corresponding cost function and constraints are shown in Equation 12.

$$\min_{u} J_\infty = \left\| \begin{bmatrix} W_{0.1}\left|\sum_{k=1}^{36} u_k e^{i\frac{2\pi}{3}(0.1)k}\right| \\ W_{0.2}\left|\sum_{k=1}^{36} u_k e^{i\frac{2\pi}{3}(0.2)k}\right| \\ \cdots \\ \cdots \\ W_{2.9}\left|\sum_{k=1}^{36} u_k e^{i\frac{2\pi}{3}(2.9)k}\right| \end{bmatrix} \right\|_\alpha \tag{12a}$$

where $\alpha = (a)0, (b)1, (c)2, (d)\infty$ subject to $$\frac{1}{30}\sum_{k=1}^{30} u_k = \frac{2}{3};\ u_k \in \{0, 1\} \tag{12b}$$

$$\sum_{k=j}^{j+5} u_k > 0;\ j = 1, 2, \ldots, 30 \tag{12c}$$

Figure 9:
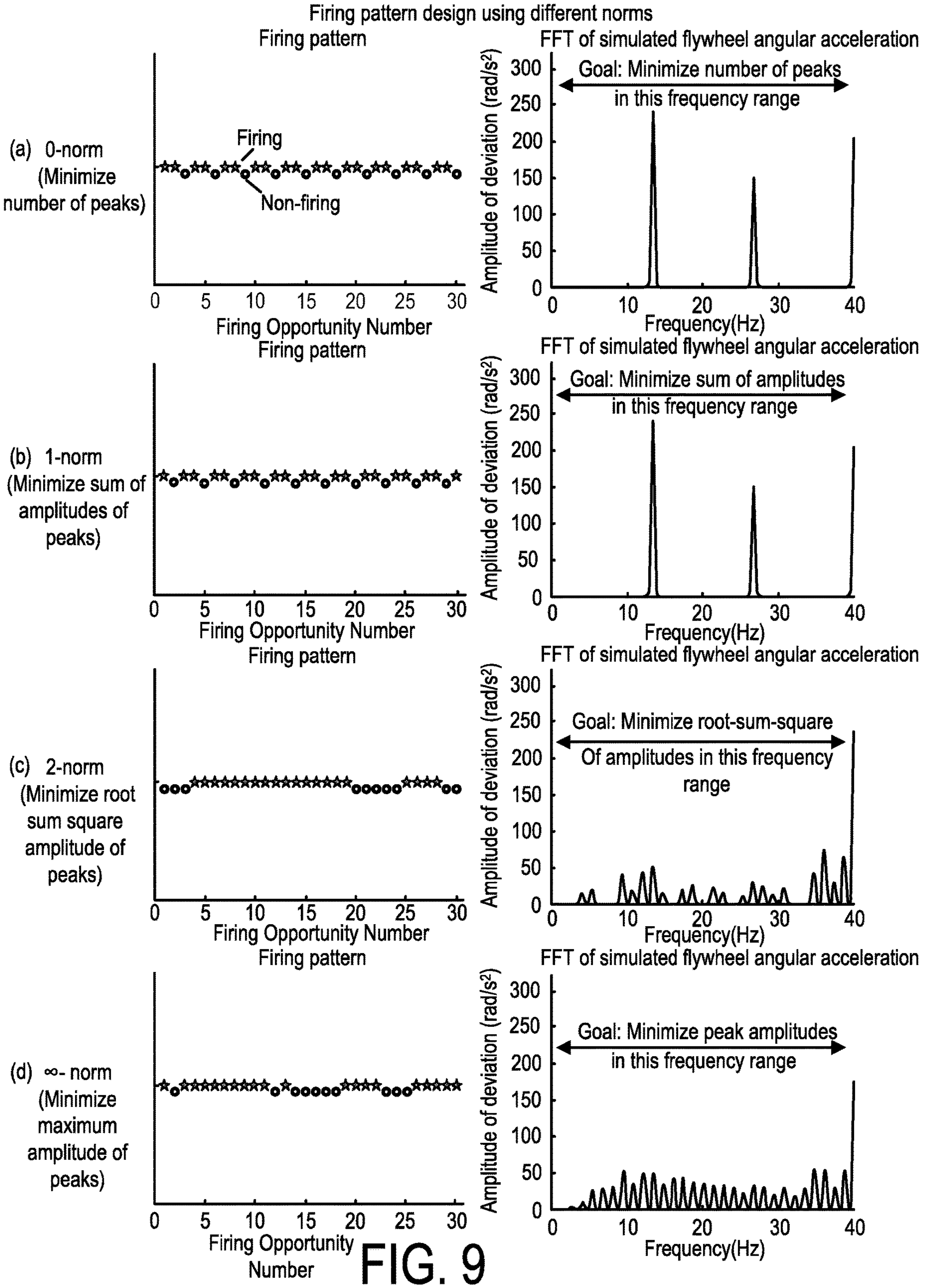
FIG. 9 includes plots of optimized DCA firing patterns and corresponding FFT of simulated flywheel angular acceleration when (a) 0-norm, (b) 1-norm, (c) 2-norm and (d) infinity-norm is used in the optimization problem, for 66% firing density and pattern length w of 30 cylinders, aiming to minimize torsional vibration at all engine orders up to (not including) third order, at 800 RPM.

FIGS. 9(*a*), 9(*b*), 9(*c*) and 9(*d*) show the firing patterns when the zero-, one-, two- and infinity-norms are used, respectively. A periodic pattern consisting of two consecutive firing events followed by one non-firing event, consistent with CDA-4CF operation (described in FIG. 3(*c*)) is generated when the 0-norm and 1-norm are used. Periodic patterns are typically generated by the 0-norm to minimize the number of distinct frequencies at which vibration content exists. The minimum sum of magnitudes of peaks, calculated using the 1-norm, is consistent with periodic operation (CDA-4CF) for this example. Use of a 2-norm, which minimizes the root-sum-square of FFT magnitudes results in a firing pattern consisting of two sets of five consecutive non-firing events (limited by the constraint shown by Equation 12c), resulting in an FFT consisting of multiple peaks with low magnitudes. Implementation of the infinity-norm minimizes the maximum FFT magnitude in the frequency range, resulting in a slightly different firing pattern consisting of a greater number of peaks with lower maximum amplitude, as shown in FIG. 9(*d*).

Figure 10:
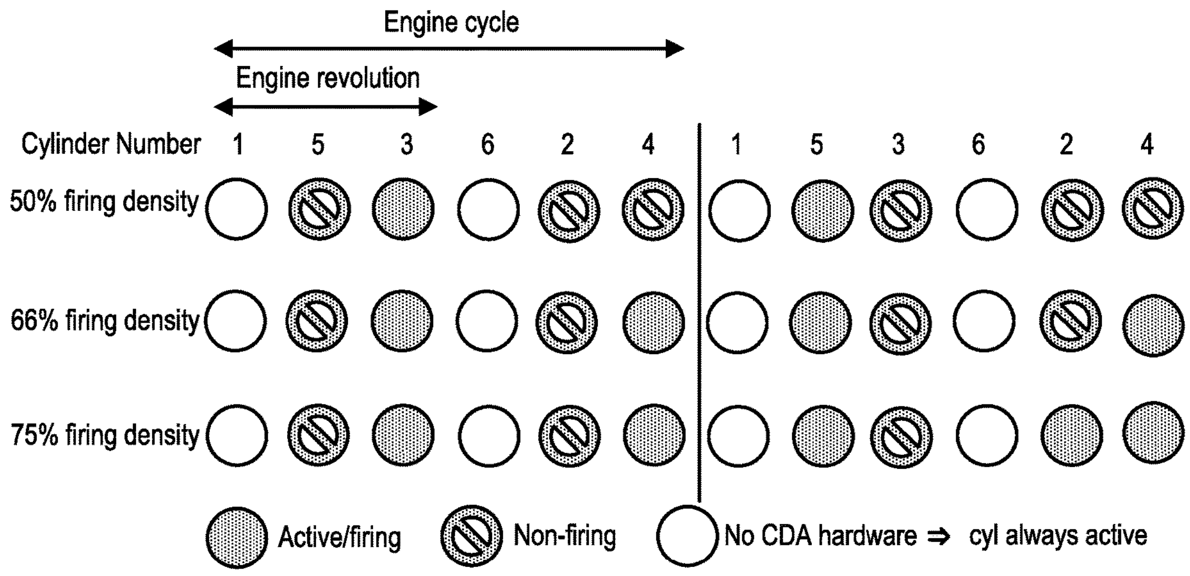
FIG. 10 is a cylinder diagram of a constrained DCA implemented when CDA hardware is installed only on a subset of cylinders (cylinders 2, 3, 4, 5) of the engine, such that cylinders not equipped with CDA are active all engine cycles.

The DCA firing patterns demonstrated so far involved intermittent activation and deactivation of all cylinders, and therefore, require installation of CDA hardware on all cylinders of the engine. DCA can also be implemented in a more constrained manner by installing CDA hardware only on a subset of cylinders of the engine, such that a few cylinders undergo periodic deactivation, while the remainder of the cylinders remain active during all engine cycles. FIG. 10 represents examples of "constrained DCA" with 50%, 66% and 75% firing densities when CDA hardware is implemented on four cylinders (cylinders 2, 3, 4, 5). Constrained DCA can achieve firing densities between $$\left(1 - \frac{n}{N}\right)$$

and 1 when UDA hardware is implemented on n cylinders of an N-cylinder engine (n≤N).

The algorithm described in this application can be extended to design firing patterns for constrained DCA, if the cylinders on which CDA hardware is not implemented are known. The elements of the optimized firing pattern array $u_k$ corresponding to the cylinders on which CDA hardware is not installed are constrained to remain at "1" (cylinders always firing). This additional constraint is represented by Equation 13, and can be used with the optimization problem described in Equation 7. Ψ is the set of indices of all cylinders that do not have CDA hardware installed, as listed in Table 3.

TABLE 3

| Cylinder Number | Corresponding element of set Ψ |
|---|---|
| 1 | 1 |
| 2 | 5 |
| 3 | 3 |
| 4 | 0 |
| 5 | 2 |
| 6 | 4 |

Figure 11:
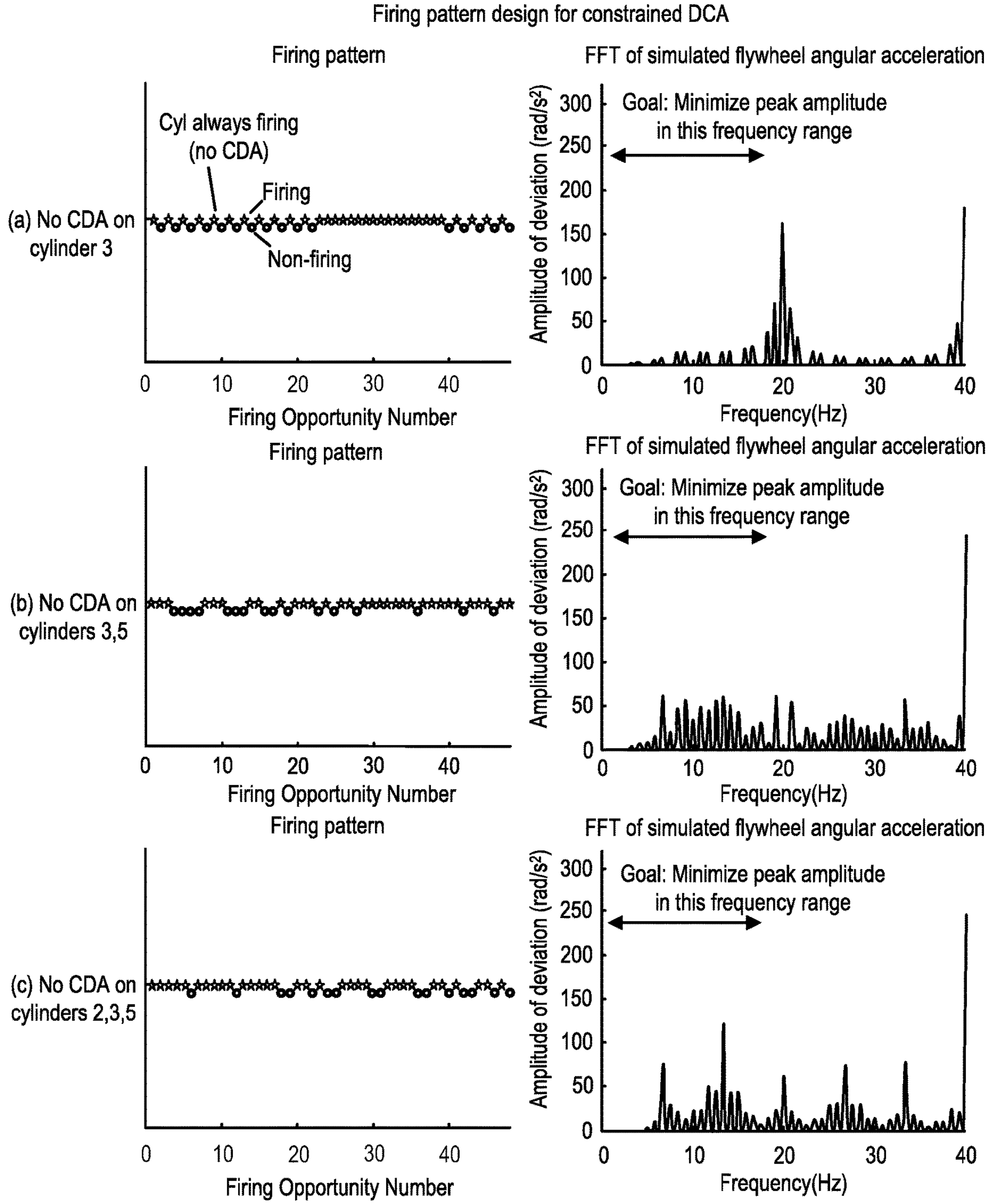
FIG. 11 includes plots of optimized firing patterns and corresponding FFT of simulated flywheel angular acceleration for constrained DCA with CDA hardware not installed on (a) cylinder-3, (b) cylinders 3 and 5, and (c) cylinders 2, 3 and 5, with firing pattern length of 8 cycles and firing density of 66% with the target to minimize the maximum frequency-domain amplitude of flywheel angular acceleration between 1 and 18 Hz at 800 RPM.

FIG. 11 shows the results obtained for three example 'constrained DCA' cases, involving different number of cylinders on which CDA hardware is not installed, for a firing density of 66% when the firing pattern length w is 48 cylinders (8 cycles). The 'undesirable' frequencies for all four cases are 1 Hz-18 Hz, and the infinity-norm is used in the optimization problem to minimize the maximum magnitude of the FM peaks. FIGS. 11(*a*), 11(*b*) and 11(*c*) represent scenarios when CDA hardware is installed on only (a) five of the six cylinders of the engine (except cylinder-3), (b) four of the six cylinders (except cylinders 3 & 5), and (c) three of the six cylinders (except cylinders 2, 3 & 5), respectively. The 'hollow stars' in the firing pattern plots correspond to cylinders that do not have CDA hardware installed, and are therefore firing every engine cycle, The additional constraint in the optimization setup for the three cases is shown by Equations 14a, 14b and 14c, respectively. Installation of CDA hardware on fewer cylinders leads to more constrained scenarios, resulting in relatively higher FFT amplitudes in the range of 'undesirable' frequencies.

$$u_{\gamma_a}=1;[\gamma_a:\mathrm{mod}(\gamma_a,6)=\{3\}] \tag{14a}$$

$$u_{\gamma_b}=1;[\gamma_b:\mathrm{mod}(\gamma_b,6)=\{3,2\}] \tag{14b}$$

$$u_{\gamma_c}=1;[\gamma_c:\ \mathrm{mod}(\gamma_c,6)=\{5,3,2\}] \tag{14c}$$

This algorithm can be used for determination of firing patterns for DCA-like operation in spark-ignited engines, where the continuous range of firing densities enabled by DCA can likely show additional fuel-efficiency merits, in addition to enabling greater control over torsional vibration.

A model simulating the FFT of flywheel acceleration of the engine was developed to (i) identify a weight function $W_{O_E}$ for the phase-angle algorithm and (ii) simulate the crankshaft torsional vibration corresponding to the optimized firing patterns obtained from the firing pattern design algorithm described in this article. Approaches similar to that described in this section can be used to simulate vibration content at other locations including driveshaft, gearbox, driver seat and steering wheel.

Figure 12:
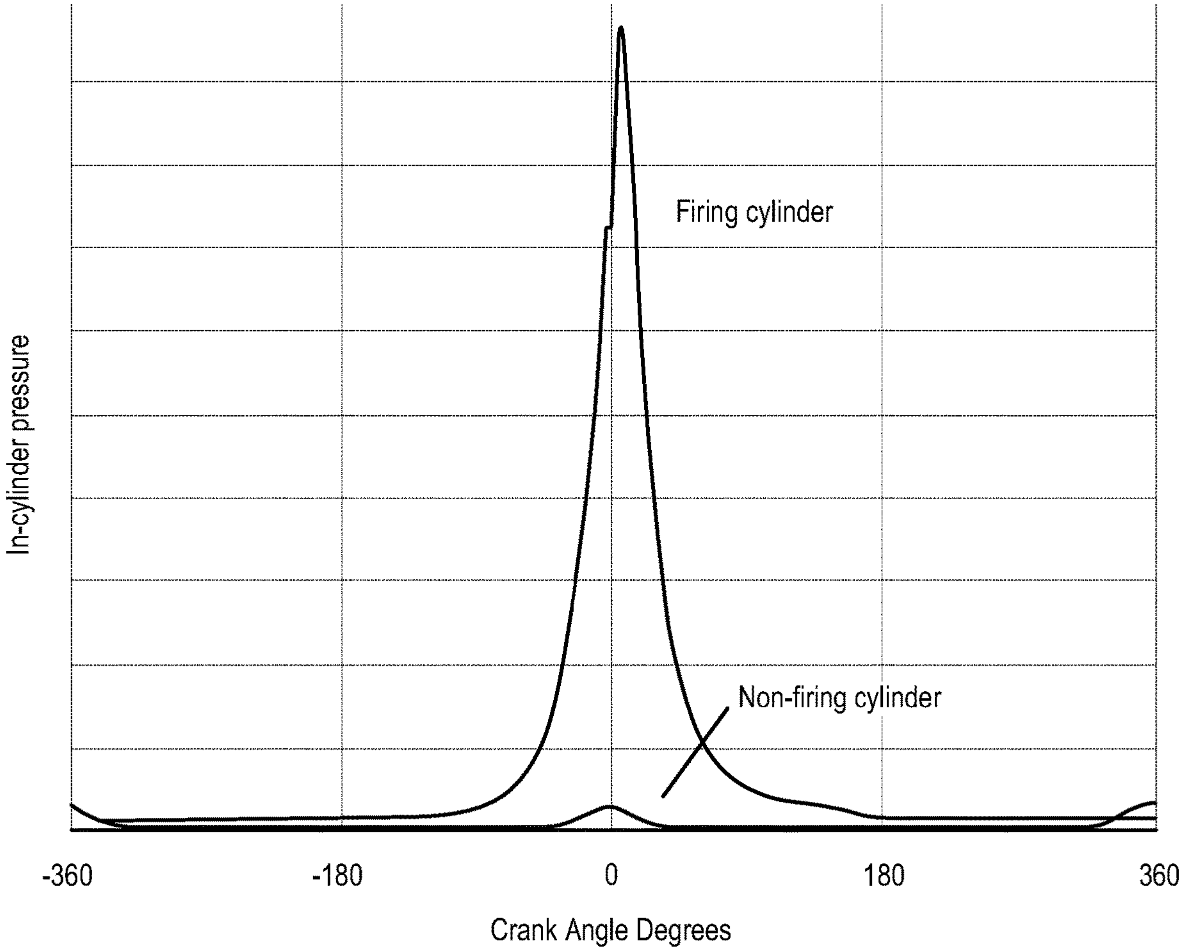
FIG. 12 is a plot of in-cylinder pressures for firing and non-firing cylinders, obtained experimentally from steady state fixed CDA operation, which were used for simulation of flywheel angular acceleration during DCA.

The input torque $T_{cyl}$ to the drivetrain from the cylinders can be simulated using a rigid-body dynamic model, dynamic model, with the piston-crankshaft assembly modeled as a slider-crank mechanism. The total torque on the crankshaft is the sum of torques generated by the pistons from the six cylinders of the engine, as described by Equations 15-17. FIG. 12 shows experimentally-obtained in-cylinder pressure traces from active and inactive cylinders during steady-state engine operation, which were used as inputs to the model.

$$T_{cyl} = T_{iner} + T_{gas} \tag{15}$$

$$T_{iner} = \frac{1}{2} M_{rec} r^2 \omega^2 \left( \frac{r}{2l} \sin\theta - \sin 2\theta - \frac{3r}{2l} \sin 3\theta \right) \tag{16}$$

$$T_{gas} = P_{cyl} A_{piston} r \sin\theta \left( 1 + \frac{r}{l} \cos\theta \right) \tag{17}$$

Figure 13:
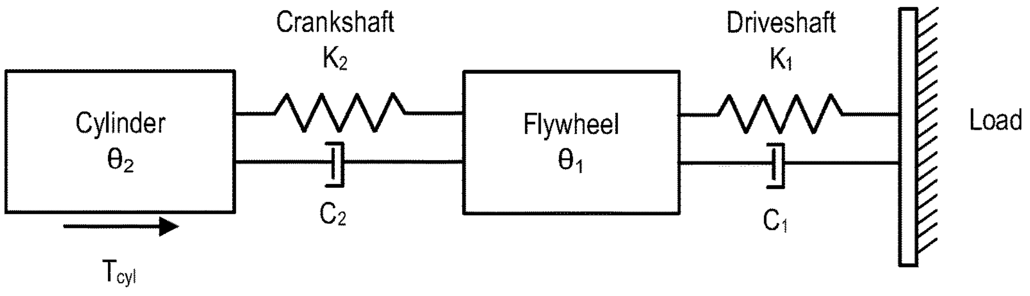
FIG. 13 is an experimental model used to obtain a transfer function.

FIG. 13 shows a driveline, consisting of the crankshaft, flywheel and driveshaft, modelled as a series rotational spring-mass-damper system on account of the elasticity of the rotating components. The crankshaft and driveshaft are modelled as parallel spring-damper systems, and the load exerted on the driveline (by the dynamometer/vehicle wheels), can be modelled as ridged. The driveline dynamics are mathematically represented by Equations 18-20 and Table 4, which identifies the symbols used in the equations.

$$I_1 \ddot{\theta}_1 = K_2(\theta_2 - \theta_1) + C_2(\dot{\theta}_2 - \dot{\theta}_1) - K_1\theta_1 - C_1\dot{\theta}_1 \tag{18}$$

$$I_2 \ddot{\theta}_2 = T_{cyl} - K_2(\theta_2 - \theta_1) + C_2(\dot{\theta}_2 - \dot{\theta}_1) \tag{19}$$

$$\dot{\theta} = A\theta + Bu \tag{20}$$

$$\text{where, } \theta = \begin{bmatrix} \dot{\theta}_1 \\ \theta_1 \\ \dot{\theta}_2 \\ \theta_2 \end{bmatrix}; B = \begin{bmatrix} 0 \\ 0 \\ 1 \\ 0 \end{bmatrix} \text{ and}$$

$$A = \begin{bmatrix} -\frac{C_1 + C_2}{I_1} & -\frac{K_1 + K_2}{I_1} & \frac{C_2}{I_1} & \frac{K_2}{I_1} \\ 1 & 0 & 0 & 0 \\ \frac{C_2}{I_2} & \frac{K_2}{I_2} & -\frac{C_2}{I_2} & -\frac{K_2}{I_2} \\ 0 & 0 & 1 & 0 \end{bmatrix}$$

TABLE 4

| Symbol | Description |
|---|---|
| $A_{piston}$ | Surface area of the piston |
| l | Length of connecting rod |
| $M_{rec}$ | Reciprocating mass |
| $P_{cyl}$ | In-cylinder pressure |
| r | Crank radius |
| $T_{crankshaft}$ | Net torque on the crankshaft |
| $T_{inertial}$ | Inertial torque on the crankshaft |
| $T_{gas}$ | Gas torque on the crankshaft |
| $\theta$ | Angular position of the crank |
| $\omega = \dot{\theta}$ | Angular velocity of the crankshaft |
| $\theta_1$ | Angular position of flywheel |
| $\dot{\theta}_1$ | Angular velocity of flywheel |
| $\theta_2$ | Angular position of engine |
| $\dot{\theta}_2$ | Angular velocity of engine |
| $K_1$ | Equivalent torsional spring constant of Driveshaft |
| $C_1$ | Equivalent torsional damping constant of Driveshaft |
| $K_2$ | Equivalent torsional spring constant of Crankshaft |
| $C_2$ | Equivalent torsional damping constant of Crankshaft |

Figure 14:
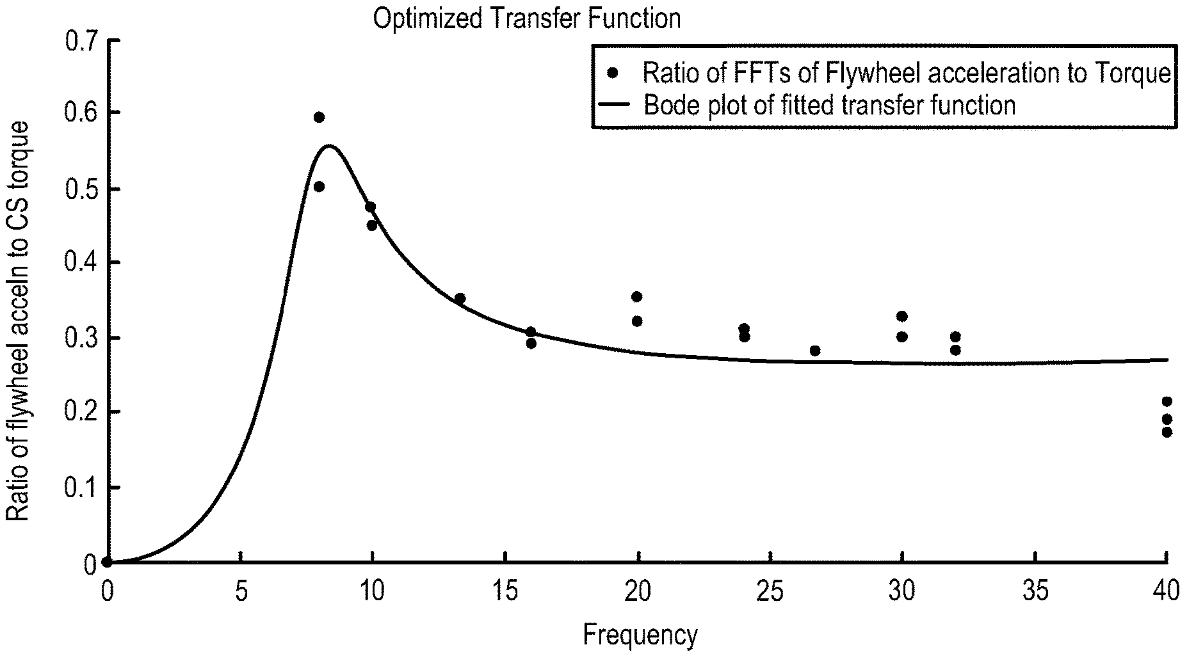
FIG. 14 is a best-fit transfer function between simulated crankshaft torque and experimental flywheel angular acceleration.

The spring and damper coefficients of the crankshaft and the driveshaft ($K_1$; $K_2$; $C_1$; $C_2$), which are unknown, are obtained by performing a least-squares fit between simulated input crankshaft torque (based on experimental in-cylinder pressure data) and experimentally-obtained flywheel angular acceleration of certain six-cylinder, CDA and DCA strategies. FIG. 14 shows a comparison of the least squares fit with the experimental data.

Figure 15:
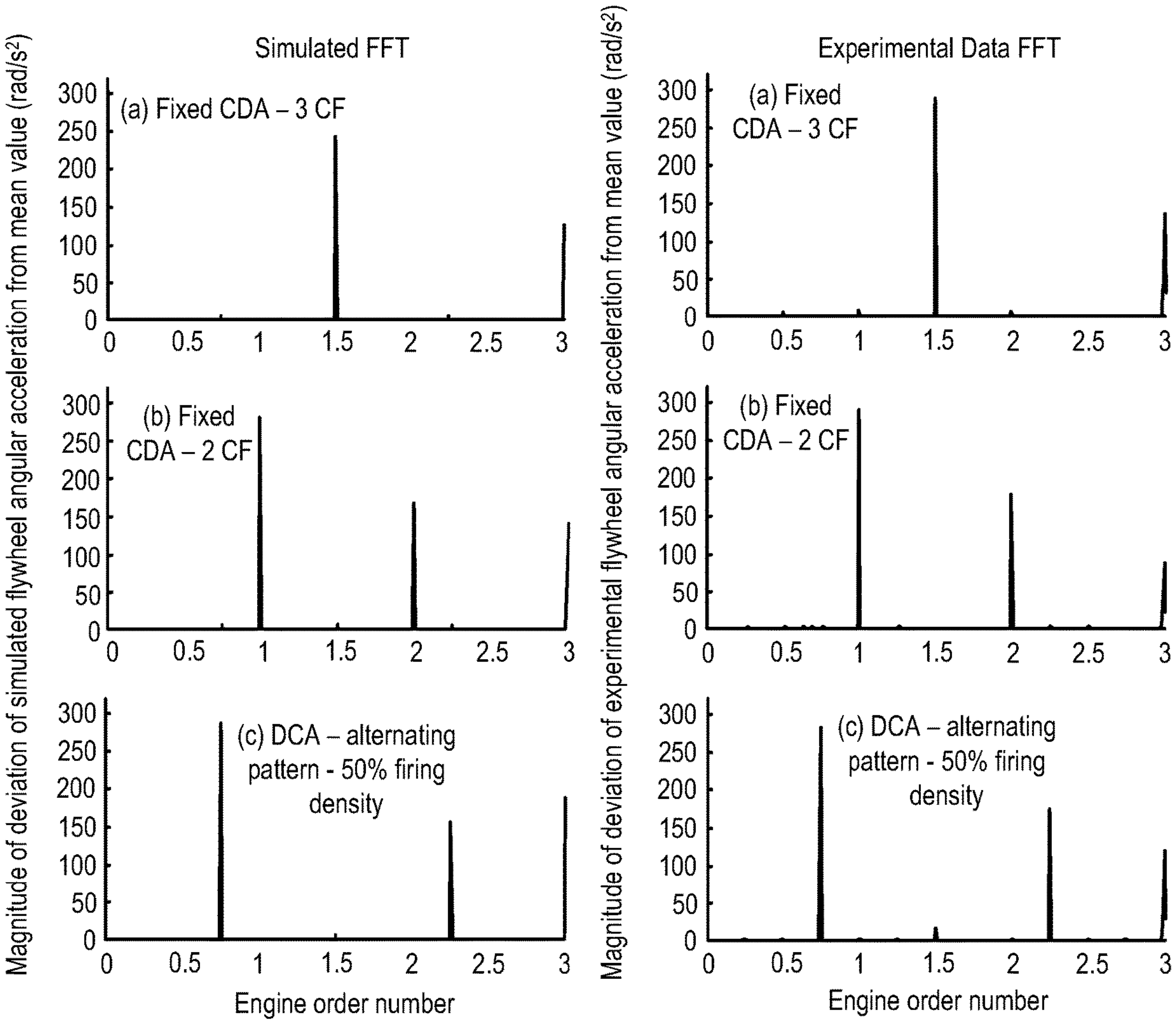
FIG. 15 shows plots of the FFT of flywheel angular acceleration model predicted by a model and flywheel FFT obtained from experimental data.

FIG. 15 shows comparisons of modelled flywheel angular acceleration FFT with the corresponding experimental data for six-cylinder operation, CDA-3CF, CDA-2CF and DCA with an alternating pattern.

The model simulating the flywheel angular acceleration can be used to identify the engine order-based weight function $W_{O_E}$ for the phase-angle algorithm. The phase-angle algorithm determines the resultant magnitude at each engine order based only on the firing pattern, and is therefore, representative of the 'input' forcing function. The weight function 'scales' the phase-angle vector magnitudes to capture the relative amplification of the magnitudes at each engine order at the flywheel.

Figure 16:
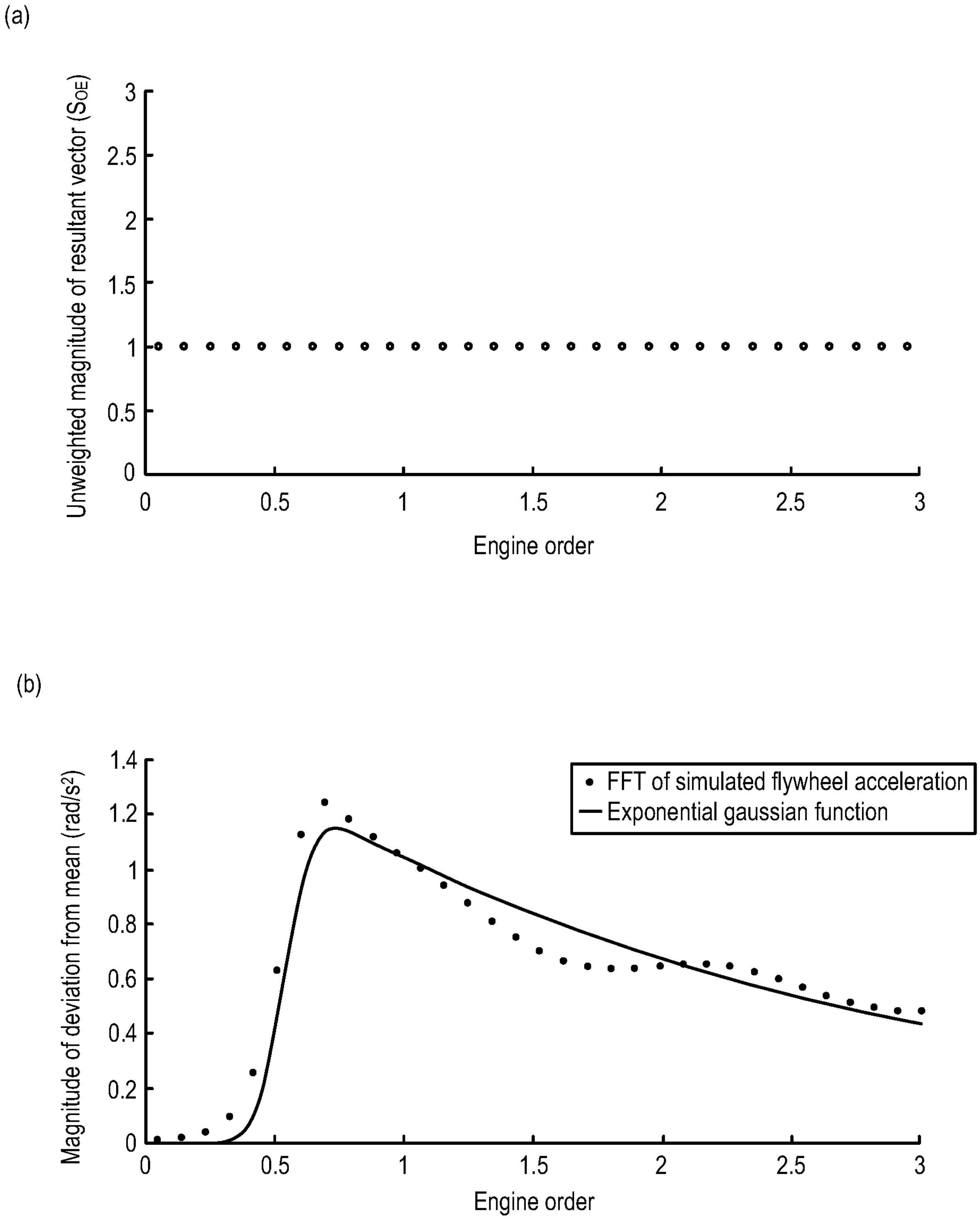
FIG. 16 is a plot of a firing pattern with one firing event followed by (w 1) non-firing events (w=100) results in (a) unweighted resultant vector magnitudes of '1' at various engine orders, and (b) an exponential Gaussian function-shaped FFT of simulated flywheel angular acceleration.

The weight function can be obtained by simulating the FFT of the flywheel angular acceleration for a firing pattern of any length w, consisting of a single firing event followed by w=1 non-firing events. The phase-angle algorithm shows magnitudes of '1' at each engine order, as shown in FIG. 16(*a*), while the model generates an FFT as shown in FIG. 16(*b*). An exponential Gaussian function, as shown by Equation 21a, was therefore chosen as the engine order-based weight function. The parameters of the exponential Gaussian Function (μ-mean, σ-standard deviation, λ-exponential relaxation time and C-constant) were tuned to match the simulated FFT trace shown in FIG. 16(*b*). The scaling factor C, which can be affected by the length of the pattern W, does not affect the relative weighting between various different orders, which is the primary objective of the weight function $W_{O_E}$.

$$f(x|\mu, \sigma, \lambda) = \frac{\lambda}{2} e^{\frac{\lambda}{2}(2\mu + \lambda\sigma^2 - 2x)} \operatorname{erfc}\left( \frac{\mu + \lambda\sigma^2 - x}{\sqrt{2}\sigma} \right) \tag{21a}$$

$$\operatorname{erfc}(x) = \frac{2}{\sqrt{\pi}} \int_x^\infty e^{-t^2} dt \tag{21b}$$

The weighting function $W_{O_E}$, is affected by changes in the shape of the pressure trace, as a result of variations in injection timing, quantity of fuel injected, intake manifold pressure and engine speed. The weighting function derived as a part of this work is applicable to the pressure traces shown in FIG. 12.

Figure 17:
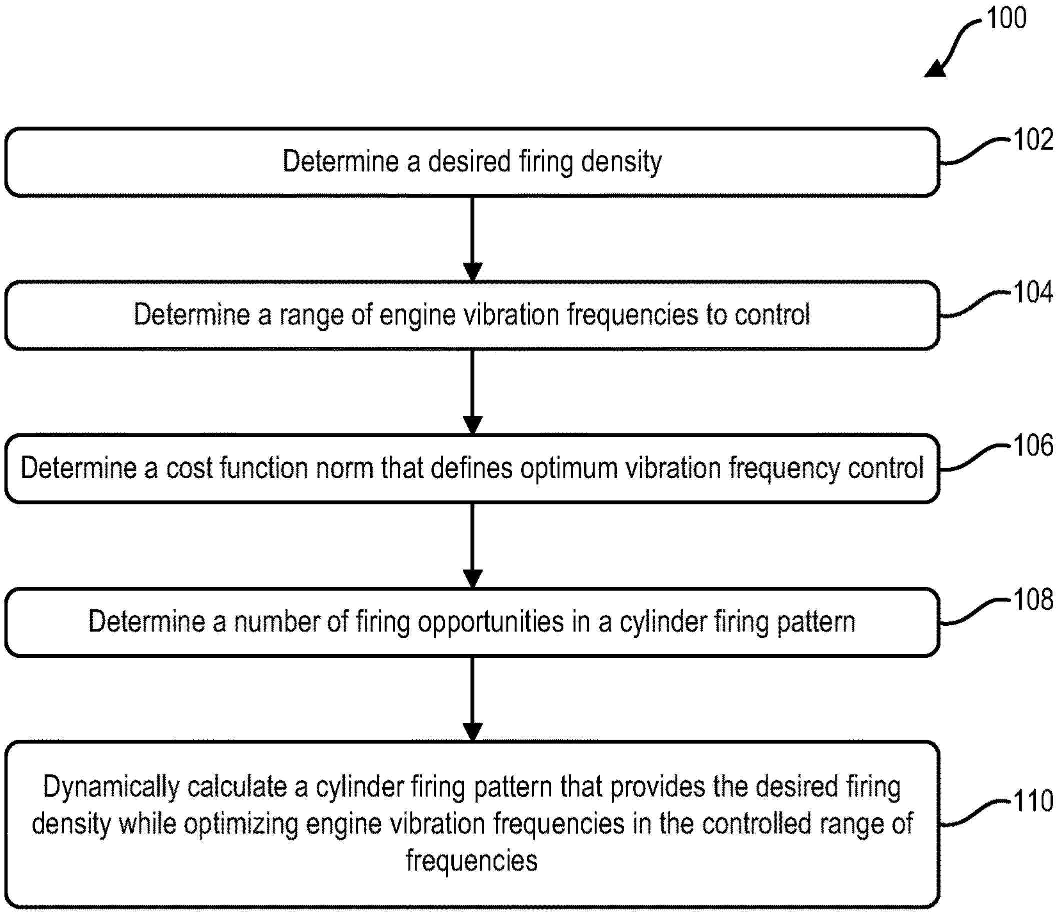
FIG. 17 is a process flow chart of a method for calculating a cylinder firing pattern.

Referring to FIG. 17, process 100 is illustrated. Process 100 includes step 102 where a desired firing density is determined for an engine based on a desired load for that engine. Process 100 also includes step 104 where a range of engine vibration frequencies to control is determined and step 106 where a cost function norm that determines how engine vibration frequency control will be optimized is determined. Process 100 also includes step 108 where a number of firing opportunities in a cylinder firing pattern is determined. Finally, in step 110 in process 100, a cylinder firing pattern is dynamically calculated to provide the desired firing density while optimizing engine vibration frequencies in the controlled range of frequencies.

Figure 18:
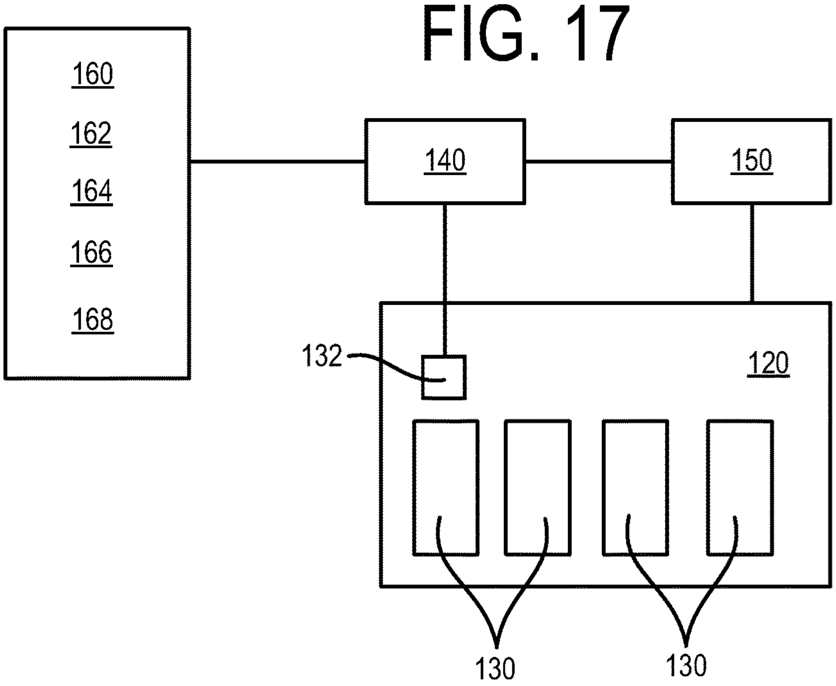
FIG. 18 is a generic depiction of an engine incorporating CDA and a system for controlling the CDA equipment.

Referring to FIG. 18, engine 120, processor 140 and controller 150 are illustrated. Engine 120 includes a plurality of cylinders 130. At least one cylinder 130 includes cylinder deactivation system 132 which facilitates selectively deactivating the associated cylinder 130 from firing. Processor 140 may be a computer that includes Random Access Memory and/or Read Only Memory. Processor 140 can be operationally connected to cylinder deactivation system 132 to control the selective operation of cylinder deactivation system 132. Engine controller 150 can be operationally connected to engine 120 to control the operation of engine 120. Processor 140 can be operationally connected to engine controller 150 and may receive data, including, but not limited to engine load and engine RPM from engine controller 150. Engine controller 150 may be an OEM engine controller for motor 120. Processor 140 receives inputs 160 including engine vibration frequencies to control 162, cost function norm 164, length of pattern 166 and maximum number of consecutive events 168. Processor 140 may be programmed to calculate a desired firing density based on load information received, such as from engine controller 150, or the desired firing density could be provided as another input 160. Processor 140 can be programed with the algorithms described above to dynamically calculate a cylinder firing pattern to provide the determined or inputted firing density while optimizing engine vibration in the inputted frequencies based on the inputted cost function norm. In general, the cost function norm minimizes either a number of vibration peaks or an amplitude of vibration peaks in the controlled ranged of engine vibration frequencies. Examples of cost function norms that could be used include, but are not limited to: minimizing a number of peaks, minimizing a sum of amplitude of peaks, minimizing root sum square amplitude of peaks and minimize a maximum amplitude of peaks. Processor 140 may provide outputs that control cylinder deactivation system 132. Processor 140 may also provide outputs to engine controller 150.

In another embodiment, the functionality of processor 140 and engine controller 150 can optionally be combined in an engine controller that performs the functions of both processor 140 and engine controller 150 described above. In other embodiments, the functionality of processor 140 can optionally be divided among multiple discrete processors that together perform the functions of processor 140.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

Various aspects of the present disclosure are set out in the following numbered clauses.

Clause 1. A method for dynamically deactivating engine cylinders of an engine equipped with a cylinder deactivation system, the method configured to control torsional vibration in the engine while deactivating cylinders, the method comprising:

in a computer, determining a desired firing density;

in the computer, determining a controlled range of engine vibration frequencies; in the computer, dynamically calculating a cylinder firing pattern that provides the desired firing density while optimizing a cost function norm in the controlled range of engine vibration frequencies, wherein the cylinder firing pattern is a sequence of firing and non-firing events; and controlling the cylinder deactivation system in the engine with the calculated cylinder firing pattern.

Clause 2. The method of clause 1, further comprising:

determining a number of firing opportunities in the cylinder firing pattern, wherein the cylinder firing pattern repeats after the number of firing opportunities in the cylinder firing pattern.

Clause 3. The method of any one of clauses 1-2, further comprising, in the computer, dynamically calculating the cylinder firing pattern using the formulas:

$$\min_u J_\alpha = \left\| \begin{bmatrix} W_{O_{E,1}} \left| \sum_{k=1}^{w} u_k e^{i\frac{4\pi}{N} O_{E,1} k} \right| \\ W_{O_{E,2}} \left| \sum_{k=1}^{w} u_k e^{i\frac{4\pi}{N} O_{E,2} k} \right| \\ \cdots \\ \cdots \end{bmatrix} \right\|_\alpha$$

subject to $$\frac{1}{w} \sum_{k=1}^{w} u_k = \rho_{firing};\ u_k \in \{0, 1\}$$

$$\sum_{k=j}^{j+5} u_k > 0;\ j = 1, 2, \ldots, w$$

where:

| Symbol | Description |
|---|---|
| i | Imaginary number ($\sqrt{-1}$) |
| j | Index number of engine order in the user-defined range of engine orders |
| k | Index number of firing event in a given engine order |
| N | Number of cylinders on the engine |
| $J_\alpha$ | Cost function using $\alpha$ norm |
| $O_{E,j}$ | Order number of $j^{th}$ relevant engine order |
| $W_{O_E}$ | Weighting factor corresponding to engine order $O_E$ |
| w | Maximum length of firing pattern |
| $u_k$ | Firing decision for $k^{th}$ firing opportunity (Non-firing event $\Leftrightarrow$ $u_k = 0$; Firing event $\Leftrightarrow$ $u_k = 1$) |
| $\rho_{firing}$ | Firing density |

Clause 4. The method of any one of clauses 1-3, further comprising, in the computer, and within a mathematical computing environment, dynamically calculating the cylinder firing pattern.

Clause 5. The method of any one of clauses 1-4, further comprising, limiting a number of consecutive non-firing events.

Clause 6. The method of any one of clauses 1-5, further comprising, selecting the cost function norm to minimize either a number of vibration peaks or an amplitude of vibration peaks in the controlled ranged of engine vibration frequencies.

Clause 7. The method of any one of clauses 1-6, wherein the cylinder deactivation system is implemented on a subset of cylinders of the engine.

Clause 8. The method of any one of clauses 1-7, wherein the controlled range of engine vibration frequencies comprises frequencies within 5% of the drivetrain resonance frequency for the engine.

Clause 9. The method of any one of clauses 1-7, wherein the controlled range of engine vibration frequencies is between 0 Hz-40 Hz.

Clause 10. The method of any one of clauses 1-7, wherein the controlled range of engine vibration frequencies is between 1 Hz-18 Hz.

Clause 11. The method of any one of clauses 1-7, wherein the controlled range of engine vibration frequencies is between 5.4√2 Hz-17√2 Hz.

Clause 12. A system comprising:

an engine comprising a plurality of cylinders, wherein the engine is responsive to varying loads;

a cylinder deactivation system configured to selectively deactivate one or more of the plurality of cylinders;

a processor programmed with a controlled range of engine vibration frequencies and a cost function norm, wherein the processor is programed to dynamically calculate a firing density responsive to a load on the engine when the load is below a particular load, wherein the processor is programmed to dynamically calculate a cylinder firing pattern that produces the calculated firing density while optimizing produced engine vibrations in the controlled range of engine vibration frequencies according to the cost function norm, wherein the cylinder firing pattern is a sequence of firing and non-firing events;

a controller configured to control the cylinder deactivation system using the calculated cylinder firing pattern.

Clause 13. The system of clause 12, wherein the processor is programmed to determine a number of firing opportunities in the cylinder firing pattern, wherein the cylinder firing pattern repeats after the number of firing opportunities in the cylinder firing pattern.

Clause 14. The system of any one of clauses 12-13, wherein the cylinder firing pattern is dynamically calculated using the formulas:

$$\min_u J_\alpha = \left\| \begin{bmatrix} W_{O_{E,1}} \left| \sum_{k=1}^{w} u_k e^{i\frac{4\pi}{N} O_{E,1} k} \right| \\ W_{O_{E,2}} \left| \sum_{k=1}^{w} u_k e^{i\frac{4\pi}{N} O_{E,2} k} \right| \\ \cdots \\ \cdots \end{bmatrix} \right\|_\alpha$$

subject to $$\frac{1}{w}\sum_{k=1}^{w} u_k = \rho_{firing};\ u_k \in \{0, 1\}$$

$$\sum_{k=j}^{j+5} u_k > 0;\ j = 1, 2, \ldots, w$$

where:

| Symbol | Description |
|---|---|
| i | Imaginary number ($\sqrt{-1}$) |
| j | Index number of engine order in the user-defined range of engine orders |
| k | Index number of firing event in a given engine order |
| N | Number of cylinders on the engine |
| $J_\alpha$ | Cost function using α norm |
| $O_{E,j}$ | Order number of $j^{th}$ relevant engine order |
| $W_{O_E}$ | Weighting factor corresponding to engine order $O_E$ |
| w | Maximum length of firing pattern |
| $u_k$ | Firing decision for $k^{th}$ firing opportunity (Non-firing event ⇔ $u_k = 0$; Firing event ⇔ $u_k = 1$) |
| $\rho_{firing}$ | Firing density |

Clause 15. The system of clause 14, wherein the processor dynamically calculates the cylinder firing pattern using a mathematical computing environment.

Clause 16. The system of any one of clauses 12-15, wherein the processor is programmed to limit a number of consecutive non-firing events.

Clause 17. The system of any one of clauses 12-16, wherein the cylinder deactivation system is implemented on a subset of cylinders of the engine.

Clause 18. The system of any one of clauses 12-17, wherein the cost function norm to minimize either a number of vibration peaks or an amplitude of vibration peaks in the controlled ranged of engine vibration frequencies.

Clause 19. The system of any one of clauses 12-18, wherein the controlled range of engine vibration frequencies comprises frequencies within 5% of the drivetrain resonance frequency for the engine.

Clause 20. The system of any one of clauses 12-18, wherein the controlled range of engine vibration frequencies is selected from the group consisting of: between 0 Hz-40 Hz, between 1 Hz-18 Hz, and between 5.4√2 Hz-17√2 Hz.

Clause 21. The system of any one of clauses 12-17, wherein the cost function norm is selected from the group consisting of: minimizing a number of peaks, minimizing a sum of amplitude of peaks, minimizing root sum square amplitude of peaks and minimize a maximum amplitude of peaks.

We claim:

1. A method for dynamically deactivating engine cylinders of an engine equipped with a cylinder deactivation system, the method configured to control torsional vibration in the engine while deactivating cylinders, the method comprising:

in a computer, determining a desired firing density;

in the computer, determining a controlled range of engine vibration frequencies;

in the computer, dynamically calculating a cylinder firing pattern that provides the desired firing density while optimizing a cost function norm in the controlled range of engine vibration frequencies, wherein the cylinder firing pattern is a sequence of firing and non-firing events; and in the computer, dynamically calculating the cylinder firing pattern using the formulas:

$$\min_u J_\alpha = \left\| \begin{bmatrix} W_{O_{E,1}} \left| \sum_{k=1}^{w} u_k e^{i\frac{4\pi}{N} O_{E,1} k} \right| \\ W_{O_{E,2}} \left| \sum_{k=1}^{w} u_k e^{i\frac{4\pi}{N} O_{E,2} k} \right| \\ \cdots \\ \cdots \end{bmatrix} \right\|_\alpha$$

subject to $$\frac{1}{w}\sum_{k=1}^{w} u_k = \rho_{firing};\ u_k \in \{0, 1\}$$

$$\sum_{k=j}^{j+5} u_k > 0;\ j = 1, 2, \ldots, w$$

where:

| Symbol | Description |
|---|---|
| i | Imaginary number ($\sqrt{-1}$) |
| j | Index number of engine order in the user-defined range of engine orders |
| k | Index number of firing event in a given engine order |
| N | Number of cylinders on the engine |
| $J_\alpha$ | Cost function using $\alpha$ norm |
| $O_{E,j}$ | Order number of $j^{th}$ relevant engine order |
| $W_{O_E}$ | Weighting factor corresponding to engine order $O_E$ |
| w | Maximum length of firing pattern |
| $u_k$ | Firing decision for $k^{th}$ firing opportunity (Non-firing event $\Leftrightarrow$ $u_k = 0$; Firing event $\Leftrightarrow$ $u_k = 1$) |
| $\rho_{firing}$ | Firing density |

controlling the cylinder deactivation system in the engine with the calculated cylinder firing pattern.

2. The method of claim 1, further comprising:

determining a number of firing opportunities in the cylinder firing pattern, wherein the cylinder firing pattern repeats after the number of firing opportunities in the cylinder firing pattern.

3. The method of claim 1, further comprising, in the computer, and within a mathematical computing environment, dynamically calculating the cylinder firing pattern.

4. The method of claim 1, further comprising limiting a number of consecutive non-firing events.

5. The method of claim 1, further comprising selecting the cost function norm to minimize either a number of vibration peaks or an amplitude of vibration peaks in the controlled ranged of engine vibration frequencies.

6. The method of claim 1, wherein the cylinder deactivation system is implemented on a subset of cylinders of the engine.

7. The method of claim 1, wherein the controlled range of engine vibration frequencies comprises frequencies within 5% of the drivetrain resonance frequency for the engine.

8. The method of claim 1, wherein the controlled range of engine vibration frequencies is between 0 Hz-40 Hz.

9. The method of claim 1, wherein the controlled range of engine vibration frequencies is between 1 Hz-18 Hz.

10. The method of claim 1, wherein the controlled range of engine vibration frequencies is between 5.4$\sqrt{2}$ Hz-17$\sqrt{2}$ Hz.

11. A system comprising:

an engine comprising a plurality of cylinders, wherein the engine is responsive to varying loads;

a cylinder deactivation system configured to selectively deactivate one or more of the plurality of cylinders;

a processor programmed with a controlled range of engine vibration frequencies and a cost function norm, wherein the processor is programed to dynamically calculate a firing density responsive to a load on the engine when the load is below a particular load, wherein the processor is programmed to dynamically calculate a cylinder firing pattern that produces the calculated firing density while optimizing produced engine vibrations in the controlled range of engine vibration frequencies according to the cost function norm, wherein the cylinder firing pattern is a sequence of firing and non-firing events; and a controller configured to control the cylinder deactivation system using the calculated cylinder firing pattern;

wherein the cylinder firing pattern is dynamically calculated using the formulas:

$$\min_u J_\alpha = \left\| \begin{bmatrix} W_{O_{E,1}} \left| \sum_{k=1}^{w} u_k e^{i\frac{4\pi}{N} O_{E,1} k} \right| \\ W_{O_{E,2}} \left| \sum_{k=1}^{w} u_k e^{i\frac{4\pi}{N} O_{E,2} k} \right| \\ \ldots \\ \ldots \end{bmatrix} \right\|_\alpha$$

subject to $$\frac{1}{w} \sum_{k=1}^{w} u_k = \rho_{firing};\ u_k \in \{0, 1\}$$

$$\sum_{k=j}^{j+5} u_k > 0;\ j = 1, 2, \ldots, w$$

where:

| Symbol | Description |
|---|---|
| i | Imaginary number ($\sqrt{-1}$) |
| j | Index number of engine order in the user-defined range of engine orders |
| k | Index number of firing event in a given engine order |
| N | Number of cylinders on the engine |
| $J_\alpha$ | Cost function using $\alpha$ norm |
| $O_{E,j}$ | Order number of $j^{th}$ relevant engine order |
| $W_{O_E}$ | Weighting factor corresponding to engine order $O_E$ |
| w | Maximum length of firing pattern |
| $u_k$ | Firing decision for $k^{th}$ firing opportunity (Non-firing event $\Leftrightarrow$ $u_k = 0$; Firing event $\Leftrightarrow$ $u_k = 1$) |
| $\rho_{firing}$ | Firing density. |

12. The system of claim 11, wherein the processor is programmed to determine a number of firing opportunities in the cylinder firing pattern, wherein the cylinder firing pattern repeats after the number of firing opportunities in the cylinder firing pattern.

13. The system of claim 11, wherein the processor dynamically calculates the cylinder firing pattern using a mathematical computing environment.

14. The system of claim 11, wherein the processor is programmed to limit a number of consecutive non-firing events.

15. The system of claim 11, wherein the cylinder deactivation system is implemented on a subset of cylinders of the engine.

16. The system of claim 11, wherein the cost function norm to minimize either a number of vibration peaks or an amplitude of vibration peaks in the controlled ranged of engine vibration frequencies.

17. The system of claim 11, wherein the controlled range of engine vibration frequencies comprises frequencies within 5% of the drivetrain resonance frequency for the engine.

18. The system of claim 11, wherein the controlled range of engine vibration frequencies is selected from the group consisting of: between 0 Hz-40 Hz, between 1 Hz-18 Hz, and between 5.4$\sqrt{2}$ Hz-17$\sqrt{2}$ Hz.

19. The system of claim 11, wherein the cost function norm is selected from the group consisting of: minimizing a number of peaks, minimizing a sum of amplitude of peaks, minimizing root sum square amplitude of peaks and minimize a maximum amplitude of peaks.

* * * * *